US012732270B2

(12) United States Patent
Zhou et al.

(10) Patent No.: US 12,732,270 B2
(45) Date of Patent: Sep. 8, 2026

(54) FAULT LOCATING METHOD FOR OPTICAL NETWORK AND RELATED DEVICE

(71) Applicant: HUAWEI TECHNOLOGIES CO., LTD., Shenzhen (CN)

(72) Inventors: Bing Zhou, Dongguan (CN); Yangjun Wan, Dongguan (CN); Zhihong Jia, Dongguan (CN); Kaidi Zhao, Dongguan (CN); Hongfei Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/600,540

(22) Filed: Mar. 8, 2024

(65) Prior Publication Data

US 2024/0214065 A1 Jun. 27, 2024

Related U.S. Application Data

(63) Continuation of application No. PCT/CN2022/134724, filed on Nov. 28, 2022.

(30) Foreign Application Priority Data

Nov. 30, 2021 (CN) ........................ 202111447464.3

(51) Int. Cl.
*H04B 10/079* (2013.01)

(52) U.S. Cl.
CPC ..... *H04B 10/0791* (2013.01); *H04B 10/0793* (2013.01)

(58) Field of Classification Search
CPC .. H04J 14/0223; H04J 14/08; H04B 10/0791; H04B 10/0793
See application file for complete search history.

(56) References Cited

U.S. PATENT DOCUMENTS 6,178,025 B1 1/2001 Hardcastle et al.
9,577,748 B2 * 2/2017 Vall-Llosera .......... H04B 10/27
(Continued)

FOREIGN PATENT DOCUMENTS

CN 108667513 A * 10/2018 ......... H04L 41/0681
CN 110838872 A 2/2020
(Continued)

OTHER PUBLICATIONS

Optics Express Fiber Fault Location Utilization Traffic Signal in Optical Network Zhao et al. (Year: 2013).*

*Primary Examiner* — David C Payne
*Assistant Examiner* — Mohammed Abdelraheem

(57) ABSTRACT

Embodiments provide a fault locating method for an optical network and a related device to reduce network complexity of fault locating and improve accuracy and efficiency of fault locating in an optical network. The method provides a network management device obtains a first sample set from a first optical network device, where the first sample set includes a plurality of optical powers obtained from the first optical network device sequentially sampling a first optical signal for a plurality of times by the first optical network device in a first fault locating time period, and at least one optical power included in the first sample set is less than or equal to an optical power threshold. The network management device determines a fault type in an optical network based on a change trend of the plurality of optical powers.

20 Claims, 25 Drawing Sheets

(56) References Cited

U.S. PATENT DOCUMENTS 10,404,362 B1 * 9/2019 Xu ........................ G06N 3/0464
11,901,938 B2 * 2/2024 Magri ................ H04B 10/0791
2013/0051791 A1 * 2/2013 Zhao ................... H04J 14/0282
398/17
2014/0099099 A1 * 4/2014 Dupuis .............. H04Q 11/0067
398/17
2014/0212131 A1 * 7/2014 Zhang .................. H04B 10/071
398/16
2021/0167851 A1 * 6/2021 Xiao ...................... H04B 10/25

FOREIGN PATENT DOCUMENTS

CN 112422175 A 2/2021
CN 110838872 B * 10/2021 ....... H04B 10/07955
WO 2021032292 A1 2/2021

* cited by examiner

FAULT LOCATING METHOD FOR OPTICAL NETWORK AND RELATED DEVICE

CROSS-REFERENCE TO RELATED APPLICATIONS

This filing is a continuation of International Application No. PCT/CN2022/134724 filed on Nov. 28, 2022, which claims priority to Chinese Patent Application No. 202111447464.3, filed on Nov. 30, 2021. The disclosures of the aforementioned applications are hereby incorporated by reference in their entireties.

TECHNICAL FIELD

This disclosure relates to the field of optical fiber communication technologies, and in particular, to a fault locating method for an optical network and a related device.

BACKGROUND

In an optical network, a transmission optical path of an optical signal includes a source optical network device, a sink optical network device, and an optical cable connected between the source optical network device and the sink optical network device. However, in a process of transmitting the optical signal along the transmission optical path, if a fault occurs on the transmission optical path, the optical signal transmitted on the transmission optical path is interrupted or transmission deteriorates.

To detect a fault on the transmission optical path, an optical detector may be integrated into the source optical network device. For example, the optical detector may be an optical frequency domain reflectometer (OFDR) or an optical time domain reflectometer (OTDR). The optical detector transmits a detection signal to the transmission optical path, and a reflection point on the transmission optical path returns Rayleigh scattering and Fresnel reflection values to the detector based on the detection signal due to a change of a refractive index. The detector determines a location of the reflection point on the optical path based on the reflection value. The reflection point may be a location such as a fault point on the optical path.

However, because the optical detector needs to be integrated into an optical network device, network complexity of an optical network is increased, and hardware costs for locating a fault point are increased. In addition, the detector needs to send a specific detection signal to the transmission optical path, which may cause interference to service light transmitted by the transmission optical path.

SUMMARY

Disclosed embodiments provide a fault locating method for an optical network and a related device, to reduce network complexity of fault locating and improve accuracy and efficiency of fault locating in an optical network.

According to a first aspect, disclosed embodiments provide a fault locating method for an optical network. The method includes: A network management device obtains a first sample set from a first optical network device, where the first sample set includes a plurality of optical powers obtained by sequentially sampling a first optical signal for a plurality of times by the first optical network device in a first fault locating time period, and at least one optical power included in the first sample set is less than or equal to an optical power threshold. The network management device determines a fault type in an optical network based on a change trend of the plurality of optical powers. According to the method described in this aspect, the network management device can locate the fault type in the optical network based on first target data from the first optical network device, to improve accuracy and efficiency of locating the fault type in the optical network. In a process of locating a fault on the optical network, a signal dedicated to fault locating does not need to be transmitted in an optical network, to avoid interference with an optical signal that carries a service.

According to the first aspect, in an optional implementation, that the network management device determines a fault type in an optical network based on a change trend of the plurality of optical powers includes: The network management device determines that the first sample set meets a first condition, where the first condition is that the plurality of optical powers decrease sequentially in the first fault locating time period, and the first fault locating time period is less than or equal to a first time threshold. The network management device determines that the fault type in the optical network is a fault on a power supply module, where the power supply module is configured to supply power to a second optical network device, and the second optical network device is configured to send the first optical signal to the first optical network device. In this implementation, a fault on the power supply module in the optical network can be accurately located, to improve efficiency of locating a fault on the power supply module.

According to the first aspect, in an optional implementation, that the network management device determines a fault type in an optical network based on a change trend of the plurality of optical powers includes: The network management device determines that the first sample set meets a second condition, where the second condition is that the plurality of optical powers show a downward change trend in the first fault locating time period, and the first fault locating time period is greater than a first time threshold used to determine a fault on a power supply module. The network management device determines that the fault type in the optical network is a fault on a transmission optical path, where the transmission optical path is used to transmit the first optical signal sent by a second optical network device to the first optical network device. In this implementation, a fault on the transmission optical path in the optical network can be accurately located, to improve efficiency of locating a fault on the transmission optical path.

According to the first aspect, in an optional implementation, before the network management device determines that the fault type in the optical network is a fault on the transmission optical path, the method further includes: The network management device obtains a second sample set, where the second sample set includes: a plurality of optical powers obtained by sequentially sampling a second optical signal for a plurality of times in a second fault locating time period, where at least one optical power included in the second sample set is less than or equal to the optical power threshold, and the second optical signal is an optical signal transmitted between a third optical network device and a fourth optical network device. The network management device determines that the second sample set meets a third condition, where the third condition is that the plurality of optical powers included in the second sample set show a downward change trend in the second fault locating time period, and the second fault locating time period is greater than the first time threshold used to determine a fault on the power supply module. That the network management device determines that the fault type in the optical network is a fault on a transmission optical path includes: The network management device determines that a fault occurs on an optical cable, where the optical cable is used to transmit the first optical signal and the second optical signal. In this implementation, a fault on the optical cable in the optical network can be accurately located, to improve efficiency of locating a fault on the optical cable.

According to the first aspect, in an optional implementation, before the network management device determines the fault type in the optical network based on the change trend of the plurality of optical powers, the method further includes: The network management device obtains a third sample set from a second optical network device, where the second optical network device is configured to send the first optical signal to the first optical network device, and the third sample set includes a plurality of optical powers obtained by sequentially sampling a third optical signal from the first optical network device for a plurality of times by the second optical network device in a third fault locating time period. That the network management device determines a fault type in an optical network based on a change trend of the plurality of optical powers includes: The network management device determines, based on the first sample set and the third sample set, that the fault type in the optical network is a fault on a transmission optical path, where the transmission optical path is used to transmit the first optical signal and the third optical signal. In this implementation, a fault on the transmission optical path in the optical network can be accurately located, to improve efficiency of locating a fault on the transmission optical path.

According to the first aspect, in an optional implementation, the first fault locating time period and the third fault locating time period at least partially overlap, or a time interval between the first fault locating time period and the third fault locating time period is less than or equal to a second time threshold. In this implementation, it can be accurately determined, by using the first fault locating time period and the third fault locating time period, that a fault on the optical network is caused by the optical cable, to improve accuracy and efficiency of locating a fault on the optical cable.

According to the first aspect, in an optional implementation, that the network management device determines, based on the first sample set and the third sample set, that the fault type in the optical network is a fault on a transmission optical path includes: The network management device determines that the first sample set and the third sample set meet a fourth condition, where the fourth condition is that the plurality of optical powers included in the first sample set show a downward change trend in the first fault locating time period, the plurality of optical powers included in the third sample set show a downward change trend in the third fault locating time period, and both the first fault locating time period and the third fault locating time period are greater than a first time threshold used to determine a fault on a power supply module. The network management device determines that a fault occurs on an optical cable, and the optical cable is connected between the first optical network device and the second optical network device. In this implementation, a fault on the optical cable can be accurately located, to improve efficiency of locating a fault on the optical cable.

According to the first aspect, in an optional implementation, that the network management device determines, based on the first sample set and the third sample set, that the fault type in the optical network is a fault on a transmission optical path includes: The network management device determines that the first sample set and the third sample set meet a fifth condition, where the fifth condition is that the plurality of optical powers included in the first sample set show a downward change trend in the first fault locating time period, a change trend of the plurality of optical powers included in the third sample set fluctuates in the third fault locating time period, and both the first fault locating time period and the third fault locating time period are greater than a first time threshold used to determine a fault on a power supply module. The network management device determines that a fault occurs on an optical cable, and the optical cable is connected between the first optical network device and the second optical network device. In this implementation, a fault on the optical cable can be accurately located, to improve efficiency of locating a fault on the optical cable.

According to the first aspect, in an optional implementation, that the network management device determines, based on the first sample set and the third sample set, that the fault type in the optical network is a fault on a transmission optical path includes: The network management device determines that the first sample set and the third sample set meet a sixth condition, where the sixth condition is that a change trend of the plurality of optical powers included in the first sample set fluctuates in the first fault locating time period, the plurality of optical powers included in the third sample set show a downward change trend in the third fault locating time period, and both the first fault locating time period and the third fault locating time period are greater than a first time threshold used to determine a fault on a power supply module. The network management device determines that a fault occurs on an optical cable, and the optical cable is connected between the first optical network device and the second optical network device. In this implementation, a fault on the optical cable can be accurately located, to improve efficiency of locating a fault on the optical cable.

According to the first aspect, in an optional implementation, that the network management device determines, based on the first sample set and the third sample set, that the fault type in the optical network is a fault on a transmission optical path includes: The network management device determines that the first sample set and the third sample set meet a seventh condition, where the seventh condition is that the plurality of optical powers included in the first sample set show a downward change trend in the first fault locating time period, the first fault locating time period is greater than a first time threshold used to determine a fault on a power supply module, and a difference between any two of the plurality of optical powers included in the third sample set in the third fault locating time period is less than or equal to a preset threshold. The network management device determines that a fault occurs on at least one of a first branch optical path and a second branch optical path, where the second optical network device is configured to send the first optical signal to the first optical network device sequentially through the second branch optical path, an optical cable, and the first branch optical path, the second branch optical path is connected between the second optical network device and the optical cable, and the first branch optical path is connected between the first optical network device and the optical cable. In this implementation, a fault on a branch optical path can be accurately located, to improve efficiency of locating a fault on the branch optical path.

According to the first aspect, in an optional implementation, that the network management device determines, based on the first sample set and the third sample set, that the fault type in the optical network is a fault on a transmission optical path includes: The network management device determines that the first sample set and the third sample set meet an eighth condition, where the eighth condition is that a difference between any two of the plurality of optical powers included in the first sample set is less than or equal to a preset threshold, the plurality of optical powers included in the third sample set show a downward change trend in the third fault locating time period, and the third fault locating time period is greater than a first time threshold used to determine a fault on a power supply module. The network management device determines that a fault occurs on at least one of a third branch optical path and a fourth branch optical path, where the first optical network device is configured to send the third optical signal to the second optical network device sequentially through the third branch optical path, an optical cable, and the fourth branch optical path, the third branch optical path is connected between the first optical network device and the optical cable, and the fourth branch optical path is connected between the second optical network device and the optical cable. In this implementation, a fault on a branch optical path can be accurately located, to improve efficiency of locating a fault on the branch optical path.

According to a second aspect, disclosed embodiments provide a fault locating method for an optical network. The method includes: A first optical network device receives a first optical signal from a second optical network device. The first optical network device obtains a first sample set, where the first sample set includes a plurality of optical powers obtained by sequentially sampling the first optical signal for a plurality of times by the first optical network device in a first fault locating time period, and at least one optical power included in the first sample set is less than or equal to an optical power threshold. The first optical network device determines a fault type in an optical network based on a change trend of the plurality of optical powers. For description of beneficial effects of this aspect, refer to the first aspect. Details are not described again.

According to the second aspect, in an optional implementation, that the first optical network device determines a fault type in an optical network based on a change trend of the plurality of optical powers includes: The first optical network device determines that the first sample set meets a first condition, where the first condition is that the plurality of optical powers decrease sequentially in the first fault locating time period, and the first fault locating time period is less than or equal to a first time threshold. The first optical network device determines that the fault type in the optical network is a fault on a power supply module, where the power supply module is configured to supply power to the second optical network device.

According to the second aspect, in an optional implementation, that the first optical network device determines a fault type in an optical network based on a change trend of the plurality of optical powers includes: The first optical network device determines that the first sample set meets a second condition, where the second condition is that the plurality of optical powers show a downward change trend in the first fault locating time period, and the first fault locating time period is greater than a first time threshold used to determine a fault on a power supply module. The first optical network device determines that the fault type in the optical network is a fault on a transmission optical path, where the transmission optical path is used to transmit the first optical signal.

According to the second aspect, in an optional implementation, before the first optical network device determines that the fault type in the optical network is a fault on the transmission optical path, the method further includes: The first optical network device receives a second sample set, where the second sample set includes: a plurality of optical powers obtained by sequentially sampling a second optical signal for a plurality of times in a second fault locating time period, where at least one optical power included in the second sample set is less than or equal to the optical power threshold, and the second optical signal is an optical signal transmitted between a third optical network device and a fourth optical network device. The first optical network device determines that the second sample set meets a third condition, where the third condition is that the plurality of optical powers included in the second sample set show a downward change trend in the second fault locating time period, and the second fault locating time period is greater than the first time threshold used to determine a fault on the power supply module. That the first optical network device determines that the fault type in the optical network is a fault on a transmission optical path includes: The first optical network device determines that a fault occurs on an optical cable, where the optical cable is used to transmit the first optical signal and the second optical signal.

According to the second aspect, in an optional implementation, before the first optical network device determines the fault type in the optical network based on a change trend of the plurality of optical powers, the method further includes: The first optical network device receives a third sample set from a second optical network device, where the third sample set includes a plurality of optical powers obtained by sequentially sampling a third optical signal from the first optical network device for a plurality of times by the second optical network device in a third fault locating time period. That the first optical network device determines a fault type in an optical network based on a change trend of the plurality of optical powers includes: The first optical network device determines, based on the first sample set and the third sample set, that the fault type in the optical network is a fault on a transmission optical path, where the transmission optical path is used to transmit the first optical signal and the third optical signal.

According to the second aspect, in an optional implementation, the first fault locating time period and the third fault locating time period at least partially overlap, or a time interval between the first fault locating time period and the third fault locating time period is less than or equal to a second time threshold.

According to the second aspect, in an optional implementation, that the first optical network device determines, based on the first sample set and the third sample set, that the fault type in the optical network is a fault on a transmission optical path includes: The first optical network device determines that the first sample set and the third sample set meet a fourth condition, where the fourth condition is that the plurality of optical powers included in the first sample set show a downward change trend in the first fault locating time period, the plurality of optical powers included in the third sample set show a downward change trend in the third fault locating time period, and both the first fault locating time period and the third fault locating time period are greater than a first time threshold used to determine a fault on a power supply module. The first optical network device determines that a fault occurs on an optical cable, and the optical cable is connected between the first optical network device and the second optical network device.

According to the second aspect, in an optional implementation, that the first optical network device determines, based on the first sample set and the third sample set, that the fault type in the optical network is a fault on a transmission optical path includes: The first optical network device determines that the first sample set and the third sample set meet a seventh condition, where the seventh condition is that the plurality of optical powers included in the first sample set show a downward change trend in the first fault locating time period, the first fault locating time period is greater than a first time threshold used to determine a fault on a power supply module, and a difference between any two of the plurality of optical powers included in the third sample set in the third fault locating time period is less than or equal to a preset threshold. The first optical network device determines that a fault occurs on at least one of a first branch optical path and a second branch optical path, where the second optical network device is configured to send the first optical signal to the first optical network device sequentially through the second branch optical path, an optical cable, and the first branch optical path, the second branch optical path is connected between the second optical network device and the optical cable, and the first branch optical path is connected between the first optical network device and the optical cable.

According to a third aspect, disclosed embodiments provide a network management device. The network management device includes a processor and a memory, and the processor is connected to the memory through a line. The processor invokes program code in the memory to obtain a first sample set from a first optical network device, where the first sample set includes a plurality of optical powers obtained by sequentially sampling a first optical signal for a plurality of times by the first optical network device in a first fault locating time period, and at least one optical power included in the first sample set is less than or equal to an optical power threshold. The processor is further configured to determine a fault type in an optical network based on a change trend of the plurality of optical powers. For description of a specific process in which the network management device locates a fault on the optical network and beneficial effects, refer to the first aspect. Details are not described again.

According to a fourth aspect, disclosed embodiments provide an optical network device. The optical network device includes a processor, a memory, and a transceiver, and the processor is separately interconnected to the memory and the transceiver through a line. The transceiver is configured to receive a first optical signal from a second optical network device. The processor is configured to obtain a first sample set, where the first sample set includes a plurality of optical powers obtained by sequentially sampling the first optical signal for a plurality of times by a first optical network device in a first fault locating time period, and at least one optical power included in the first sample set is less than or equal to an optical power threshold. The processor is further configured to determine a fault type in an optical network based on a change trend of the plurality of optical powers. For description of a specific process in which the optical network device locates a fault on the optical network and beneficial effects, refer to the first aspect. Details are not described again.

According to a fifth aspect, disclosed embodiments provide a computer-readable storage medium. The storage medium stores a computer program. The computer program includes program instructions. When the program instructions are executed by the processor, the processor is enabled to perform the method described in any one of the first aspect or the second aspect.

According to a sixth aspect, disclosed embodiments provide an optical network. The optical network includes a network management device, a first optical network device, and a second optical network device. The network management device is configured to perform the method according to any one of the first aspect.

According to a seventh aspect, disclosed embodiments provide an optical network. The optical network includes a network management device, a first optical network device, and a second optical network device. The first optical network device is configured to perform the method according to any one of the second aspect.

DESCRIPTION OF EMBODIMENTS

The following clearly and completely describes the technical solutions in disclosed embodiments with reference to the accompanying drawings. The described embodiments are merely illustrative of some, but not all, possible embodiments. All other embodiments obtained by persons skilled in the art based on disclosed embodiments without creative efforts shall fall within the protection scope of the present disclosure.

Figure 1:
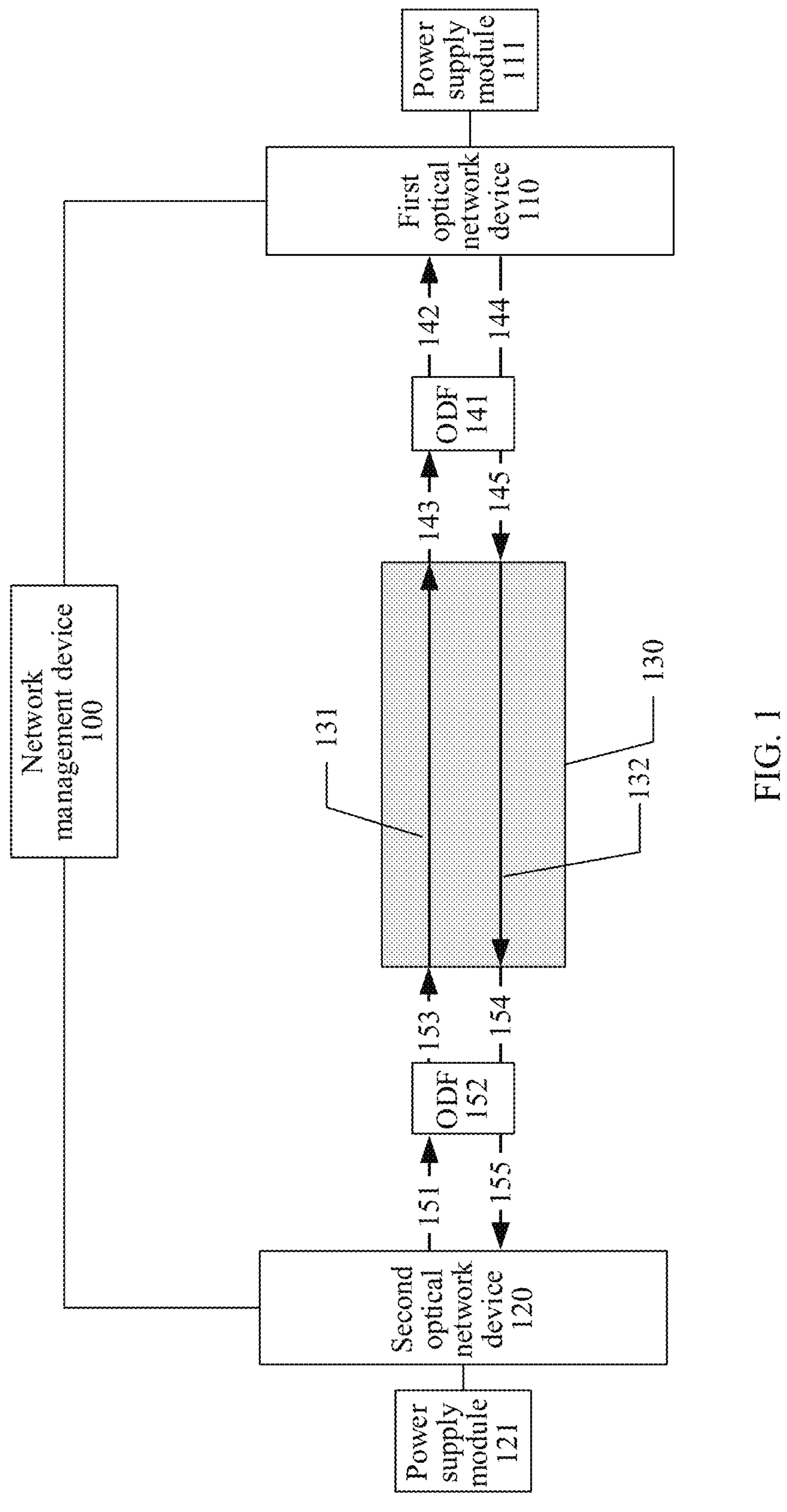
FIG. 1 is a first example diagram of a structure of an optical network according to this disclosure.

The fault locating method for an optical network provided in this disclosure is applied to an optical network. The optical network may be used in a data center, a metropolitan area network, a passive optical network (PON), long-haul transmission, or the like. This is not specifically limited. The following optionally describes a structure of the optical network with reference to FIG. 1. FIG. 1 is a first example diagram of a structure of an optical network according to this disclosure.

As shown in FIG. 1, the optical network includes a first optical network device 110 and a second optical network device 120. When a service needs to be exchanged between the first optical network device 110 and the second optical network device 120, the second optical network device 120 is configured to send, to the first optical network device 110, a first optical signal that carries a service. The first optical network device 110 is configured to send, to the second optical network device 120, a third optical signal that carries a service.

A first transmission optical path is connected between the second optical network device 120 and the first optical network device 110, and the first transmission optical path is used to transmit the first optical signal. It can be learned that the first transmission optical path transmits the first optical signal from the second optical network device 120 to the first optical network device 110.

The following describes a structure of the first transmission optical path used to transmit the first optical signal. The first transmission optical path sequentially includes a second branch optical path, an optical cable 130, and a first branch optical path according to a transmission direction of the first optical signal. The second branch optical path is connected between the second optical network device 120 and the optical cable 130. The first branch optical path is connected between the first optical network device 110 and the optical cable 130. A structure of the first branch optical path is used as an example. The first branch optical path includes an optical distribution frame (ODF) 141. A fiber patch cord 142 used to transmit the first optical signal is connected between the ODF 141 and the first optical network device 110. The fiber patch cord 142 may also be referred to as a fiber connector. Both ends of the fiber patch cord 142 are provided with connectors, a connector at one end of the fiber patch cord 142 is connected to an optical port of the first optical network device 110, and a connector at the other end of the fiber patch cord 142 is connected to the ODF 141. A fiber pigtail 143 used to transmit the first optical signal is connected between the ODF 141 and the optical cable 130. One end of the fiber pigtail 143 is a connector, and the other end is a broken end of a fiber core of an optical cable. The connector of the fiber pigtail 143 is connected to the ODF 141. The broken end of the fiber pigtail 143 is connected to a fiber core included in the optical cable 130 through mechanical connection or fusion. It can be learned that the first optical signal emitted by the optical cable 130 is sequentially transmitted to the first optical network device 110 through the fiber pigtail 143, the ODF 141, and the fiber patch cord 142 included in the first branch optical path. Similarly, the second branch optical path includes an ODF 152, and a fiber patch cord 151 used to transmit the first optical signal is connected between the ODF 152 and the second optical network device 120. A fiber pigtail 153 used to transmit the first optical signal is connected between the ODF 152 and the optical cable 130. It can be learned that the first optical signal output by the second optical network device 120 is sequentially transmitted to the optical cable 130 through the fiber patch cord 151, the ODF 152, and the fiber pigtail 153. One end of a fiber core 131 included in the optical cable 130 is connected to the fiber pigtail 143, and the other end is connected to the fiber pigtail 153, to connect the first branch optical path and the second branch optical path through the optical cable.

The following describes a structure of a second transmission optical path used to transmit the third optical signal. The second transmission optical path sequentially includes a third branch optical path, the optical cable 130, and a fourth branch optical path according to a transmission direction of the third optical signal. The third branch optical path is connected between the first optical network device 110 and the optical cable 130, and the fourth branch optical path is connected between the second optical network device 120 and the optical cable 130. A structure of the third branch optical path is used as an example. The third branch optical path includes an ODF 141, and a fiber patch cord 144 used to transmit the third optical signal is connected between the ODF 141 and the first optical network device 110. One end of the fiber patch cord 144 is connected to an optical port of the first optical network device 110, and a connector at the other end of the fiber patch cord 144 is connected to the ODF 141. A fiber pigtail 145 used to transmit the third optical signal is connected between the ODF 141 and the optical cable 130. It can be learned that the third optical signal emitted by the first optical network device 110 is transmitted to the optical cable 130 sequentially through the fiber patch cord 144, the ODF 141, and the fiber pigtail 145 included in the third branch optical path. Similarly, the fourth branch optical path includes an ODF 152, and a fiber patch cord 155 used to transmit the third optical signal is connected between the ODF 152 and the second optical network device 120. A fiber pigtail 154 used to transmit the third optical signal is connected between the ODF 152 and the optical cable 130. It can be learned that the third optical signal output by the optical cable 130 is transmitted to the second optical network device 120 sequentially through the fiber pigtail 154, the ODF 152, and the fiber patch cord 155. One end of a fiber core 132 included in the optical cable 130 is connected to the fiber pigtail 145, and the other end is connected to the fiber pigtail 154, to connect the third branch optical path and the fourth branch optical path through the optical cable.

The optical network further includes a network management device 100 connected to the first optical network device 110 and the second optical network device 120. The network management device 100 is configured to monitor a fault on a connected optical network device.

The optical cable 130 includes a plurality of fiber cores (for example, the fiber core 131 and the fiber core 132 shown in FIG. 1) and claddings that surround outer peripheral surfaces of the plurality of fiber cores. Two ends of each fiber core are used to connect fiber pigtails on both sides. The cladding is used to protect the fiber core from mechanical damage, so as to ensure safety of optical signals transmitted by the fiber core.

The optical network further includes a power supply module 121 connected to the second optical network device 120. The power supply module 121 is configured to supply power to the second optical network device 120. The power supply module 121 includes a mains supply line and a power obtaining module. The mains supply line is configured to transmit a power frequency alternating current, and the power obtaining module is configured to: obtain a supply current from the mains supply line, and transmit the supply current to the second optical network device 120. The supply current is used to supply power to an active component in the second optical network device 120. The power obtaining module may be a transformer or the like. This is not specifically limited. The optical network further includes a power supply module 111 connected to the first optical network device 110. The power supply module 111 is configured to supply power to the first optical network device 110. For the description of the power supply module 111, refer to the description of the power supply module 121. Details are not described again.

It should be noted that, in this example, an example in which the optical network includes two interconnected optical network devices is used for description, and a quantity of optical network devices included in the optical network and a topology relationship formed by connections between a plurality of optical network devices are not limited in this example.

According to the fault locating method provided in this disclosure, a fault on a power supply module included in an optical network can be located, and a fault on a transmission optical path can be further located. The transmission optical path is a branch optical path and an optical cable that are connected between the first optical network device and the second optical network device. The following describes a specific implementation of fault locating with reference to the embodiments.

EMBODIMENT 1

Figure 2:
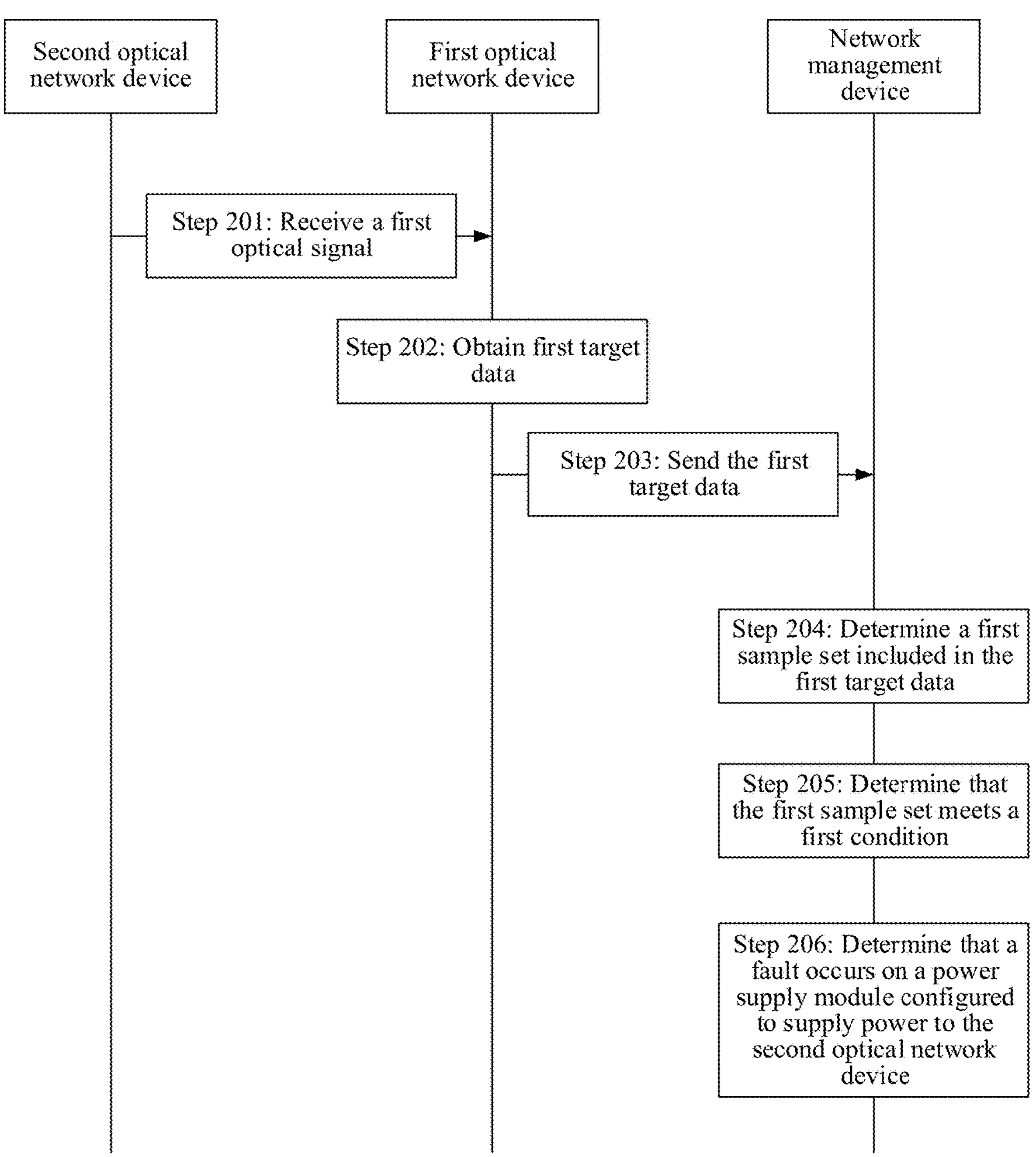
FIG. 2 is a flowchart of steps of a first fault locating method for an optical network according to an embodiment of this disclosure.

According to a fault locating method for an optical network described in this embodiment, a network management device can detect whether a fault occurs on a power supply module included in the optical network. When the network management device determines that a fault occurs on the power supply module, the network management device may indicate operation and maintenance personnel to repair the power supply module. For a specific performing process, refer to FIG. 2. FIG. 2 is a flowchart of steps of a first fault locating method for an optical network according to an embodiment of this disclosure.

Step 201: A first optical network device receives a first optical signal from a second optical network device.

In this embodiment, the second optical network device sends the first optical signal to the first optical network device sequentially through a second branch optical path, an optical cable, and a first branch optical path. For description of the second branch optical path, the optical cable, and the first branch optical path, refer to FIG. 1. Details are not described again.

Step 202: The first optical network device sequentially samples the first optical signal for a plurality of times, to obtain first target data.

The first optical network device in this embodiment presets a sample periodicity, and the sample periodicity is a time interval between two times of adjacent sampling performed by the first optical network device on the first optical signal. The sample periodicity shown in this embodiment is less than 1 second. It should be noted that description of a length of the sample periodicity in this embodiment is an optional example, and this is not limited.

Figure 3:
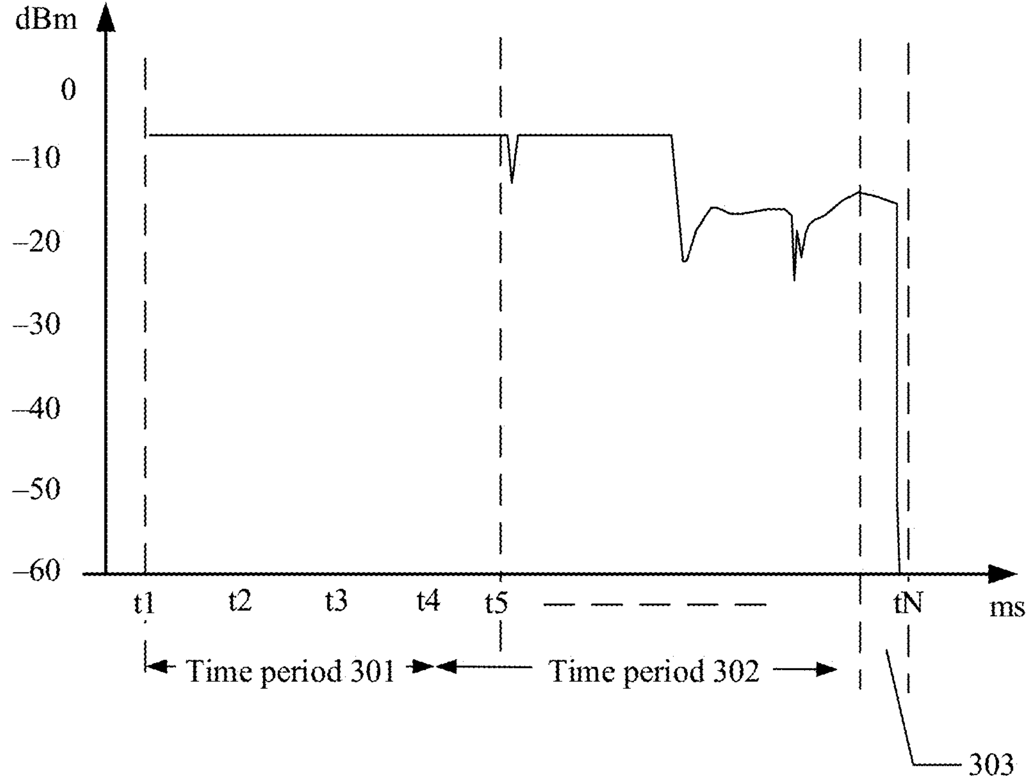
FIG. 3 is an example diagram of a first correspondence of first target data according to an embodiment of this disclosure.

For description of the first target data, refer to FIG. 3. FIG. 3 is an example diagram of a first correspondence of the first target data according to an embodiment of this disclosure. The first target data includes a sample moment at which sampling is performed on the first optical signal. A sample moment t1 and a sample moment t2 to a sample moment tM are shown in horizontal coordinates in FIG. 3. M in this embodiment may be any positive integer greater than 1. The first target data further includes an optical power obtained by sampling the first optical signal at each sample moment. In a coordinate system shown in FIG. 3, a unit of a horizontal coordinate may be millisecond (ms), and a unit of a vertical coordinate may be decibel milliwatt (dBm).

Step 203: The first optical network device sends the first target data to the network management device.

In this embodiment, when the first optical network device obtains the first target data, the first optical network device sends the first target data to the network management device. Optionally, the first optical network device may compress the first target data, to send compressed first target data to the network management device. It can be learned that, in a manner in which the first optical network device sends the compressed first target data to the network management device, an amount of data transmitted by the first optical network device to the network management device is reduced, and efficiency of fault locating in an optical network is improved.

Step 204: The network management device determines a first sample set included in the first target data.

The network management device in this embodiment can monitor a change trend of a plurality of optical powers included in the first target data, to determine whether the first target data includes the first sample set. At least one optical power included in the first sample set in a first fault locating time period is less than or equal to an optical power threshold. It can be learned that the first sample set includes a plurality of optical powers obtained by sequentially sampling the first optical signal by the first optical network device for a plurality of times in the first fault locating time period, and one or more optical powers are less than or equal to the optical power threshold.

A value of the optical power threshold may be related to sensitivity for receiving an optical signal by the first optical network device. When an optical power of the first optical signal is less than or equal to the optical power threshold, the first optical network device cannot successfully receive the first optical signal, so that optical-to-electrical conversion cannot be successfully performed on the first optical signal whose optical power is less than or equal to the optical power threshold. The optical power threshold in this embodiment may also be related to a packet loss rate of transmitting the first optical signal on a first transmission optical path. If the optical power of the first optical signal is less than or equal to the optical power threshold, if the packet loss rate in a process of transmitting the first optical signal through the first transmission optical path is excessively large, it indicates that a degradation degree of transmission of the first optical signal is excessively large. In this embodiment, an example in which the optical power threshold is −60 dBm is used for description. It can be learned that if one or more optical powers received by the first optical network device are less than or equal to the optical power threshold, it indicates that a fault occurs in the optical network.

Specifically, the network management device monitors forms of a plurality of consecutive optical powers included in the first target data, to determine whether the first target data includes the first sample set. The first sample set includes one or more optical powers that are less than or equal to the power threshold.

This embodiment is described by using an example in which the network management device identifies the first sample set from the first target data. In another example, the first optical network device may also identify the first sample set from the first target data, and the first optical network device directly sends the first sample set to the network management device.

Step 205: The network management device determines that the first sample set meets a first condition.

The first condition is that the plurality of optical powers included in the first sample set decrease sequentially in the first fault locating time period until an optical power is less than or equal to the power threshold. In addition, the first fault locating time period is less than or equal to a first time threshold. This embodiment is described by using an example in which the first time threshold is any value between 3 ms and 20 ms. Duration of the first time threshold in this embodiment is short, and description of a specific value is an optional example and is not limited.

Still refer to FIG. 3. In duration of a time period 301, a start sample moment of the time period 301 is t1, and an end sample moment of the time period 301 is t5. It is determined that a change trend of a plurality of optical powers corresponding to the time period 301 is flat, and any optical power in the time period 301 is greater than the power threshold. In this case, the plurality of optical powers corresponding to the time period 301 do not meet the first condition. That the change trend of the plurality of optical powers is flat means that any two of the plurality of optical powers are close to each other. As a result, a change trend of the plurality of optical powers corresponding to the time period 301 shows a straight line, or fluctuates with a small arc.

The network management device determines, in duration of a time period 302, that a change trend of a plurality of optical powers corresponding to the time period 302 fluctuates. In this case, there is one or more troughs in the change trend of the plurality of optical powers corresponding to the time period 302. In addition, an optical power corresponding to any trough is greater than the optical power threshold. In this case, the network management device determines that the plurality of optical powers corresponding to the time period 302 do not meet the first condition.

The network management device determines, in duration of a first fault locating time period 303, that a plurality of optical powers corresponding to the first fault locating time period 303 sequentially decreases, and the plurality of optical powers corresponding to the first fault locating time period 303 start to decrease at a start moment of the first fault locating time period 303 and decrease to the optical power threshold. As shown in FIG. 3, in the first fault locating time period 303, the plurality of optical powers decrease to the optical power threshold (−60 dBm) from the start sample moment of the first fault locating time period 303. In addition, the first fault locating time period is less than or equal to the first time threshold (for example, 5 ms). In this case, when the network management device determines that the plurality of optical powers corresponding to the first fault locating time period 303 meet the first condition, it may be learned that the plurality of optical powers corresponding to the first fault locating time period 303 are in the first sample set.

It should be noted that, in this embodiment, description of the change trend of the plurality of optical powers included in the first target data is an optional example, and is not limited. For example, when an environment of the first transmission optical path is good, because no external force acts on the transmission optical path, a change trend of optical powers transmitted on the first transmission optical path may be flat until the first sample set that meets the first condition appears.

Step 206: The network management device determines that a fault type in the optical network is a fault on a power supply module configured to supply power to the second optical network device.

In this embodiment, when the network management device determines that the first target data includes the first sample set that meets the first condition, the network management device determines, based on stored topology information, that the first optical signal received by the first optical network device is from the second optical network device. The network management device determines that a fault occurs on the power supply module configured to supply power to the second optical network device. As a result, the first sample set meeting the first condition appears in the first optical signal received by the first optical network device from the second optical network device. For description of the power supply module configured to supply power to the second optical network device, refer to the description corresponding to FIG. 1. Details are not described again.

According to the method described in this embodiment, the network management device can directly locate, based on the first target data from the first optical network device, a fault on the power supply module used to supply power to the second optical network device. Therefore, accuracy and efficiency of locating a fault on the power supply module are improved, and timeliness of locating a fault on the power supply module is improved. In the process of locating a fault on the power supply module in this embodiment, a hardware device specially used for locating a fault does not need to be added in the optical network, to reduce network complexity and costs of locating a fault in the optical network. In addition, in a process in which the second optical network device sends the first optical signal to the first optical network device, a fault on the power supply module is located, and a signal dedicated to fault locating does not need to be transmitted in the optical network, to avoid interference with the first optical signal that carries a service.

EMBODIMENT 2

Figure 4:
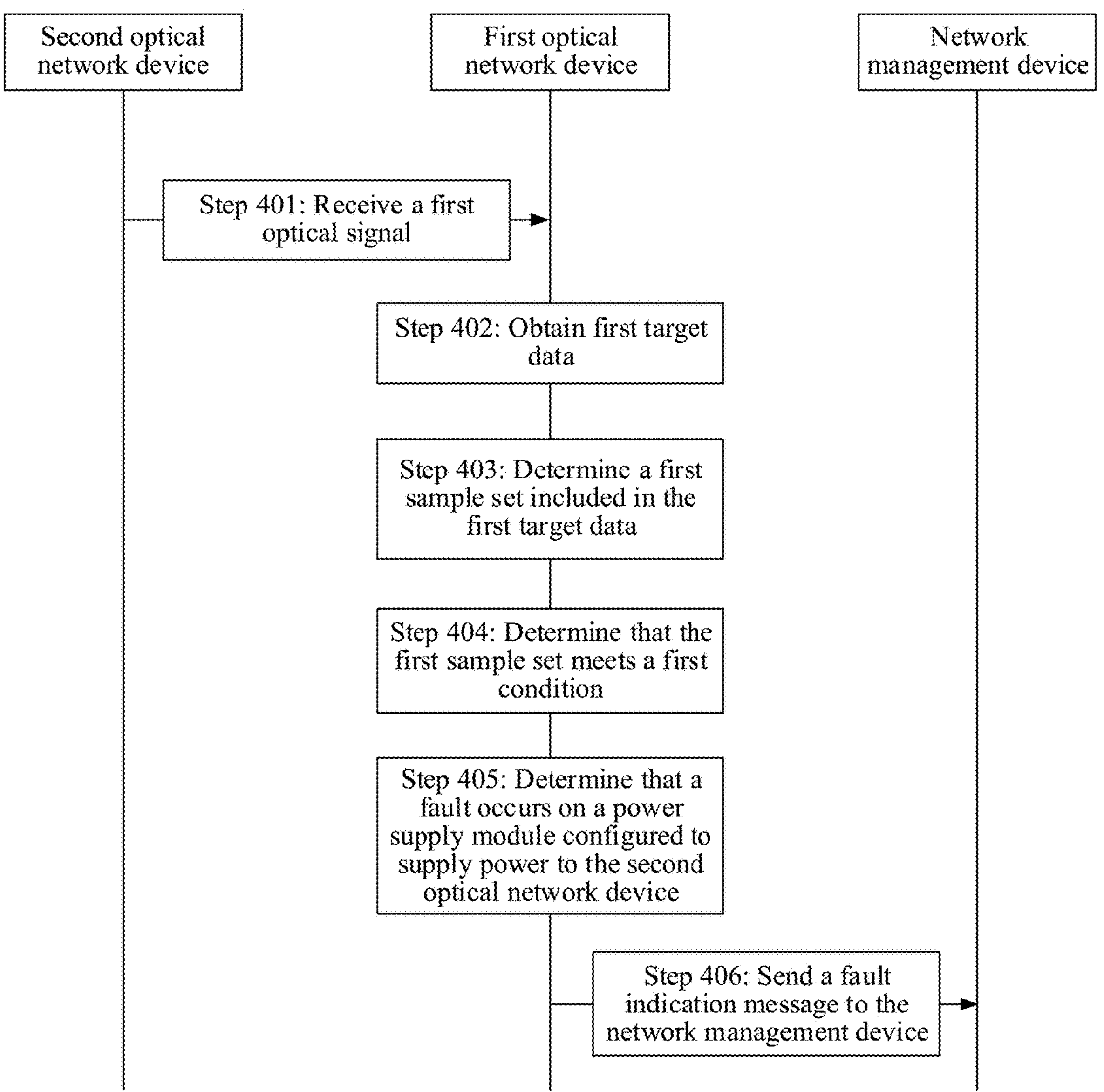
FIG. 4 is a flowchart of steps of a second fault locating method for an optical network according to an embodiment of this disclosure.

In Embodiment 1, the network management device determines whether a fault on the power supply module occurs in the optical network. In this embodiment, the first optical network device determines whether a fault on the power supply module occurs in the optical network. For description of a performing process of this embodiment, refer to FIG. 4. FIG. 4 is a flowchart of steps of a second fault locating method for an optical network according to an embodiment of this disclosure.

Step 401: The first optical network device receives a first optical signal from a second optical network device.

Step 402: The first optical network device sequentially samples the first optical signal for a plurality of times, to obtain first target data.

For description of a performing process of step 401 and step 402, refer to step 201 and step 202 in Embodiment 1. Details are not described again.

Step 403: The first optical network device determines a first sample set included in the first target data.

For description of a process in which the first optical network device determines the first sample set included in the first target data in this embodiment, refer to the description of the process in which the network management device determines the first sample set included in the first target data in step 204 in Embodiment 1. Details are not described again.

Step 404: The first optical network device determines that the first sample set meets a first condition.

For the description of determining, by the first optical network device, that the first sample set meets the first condition in this embodiment, refer to the description of determining, by the network management device, that the first sample set meets the first condition in step 205 in Embodiment 1. Details are not described again.

Step 405: The first optical network device determines that a fault type in the optical network is a fault on a power supply module configured to supply power to the second optical network device.

For description of a process in which the first optical network device determines that the fault type in the optical network is a fault on the power supply module in this embodiment, refer to the description of determining, by the network management device, a fault on the power supply module in step 206 in Embodiment 1. Details are not described again.

Step 406: The first optical network device sends a fault indication message to the network management device.

In this embodiment, when the first optical network device determines that a fault type in the optical network is a fault on the power supply module configured to supply power to the second optical network device, the first optical network device sends the fault indication message to the network management device. The fault indication message indicates that a fault occurs on the power supply module. The power supply module is configured to supply power to the second optical network device.

When the network management device receives the fault indication message, the network management device determines that a fault occurs on the power supply module configured to supply power to the second optical network device.

According to the method described in this embodiment, the first optical network device locates, based on the first target data obtained through sampling, a fault on the power supply module configured to supply power to the second optical network device. The first optical network device indicates, to the network management device by using the fault indication message sent to the network management device, that a fault occurs on the power supply module configured to supply power to the second optical network device. Therefore, accuracy and efficiency of locating a fault on the power supply module are effectively improved, and timeliness of locating a fault on the power supply module is improved. The first optical network device locates a fault on the power supply module, and this reduces a calculation amount of the network management device.

EMBODIMENT 3

Figure 5:
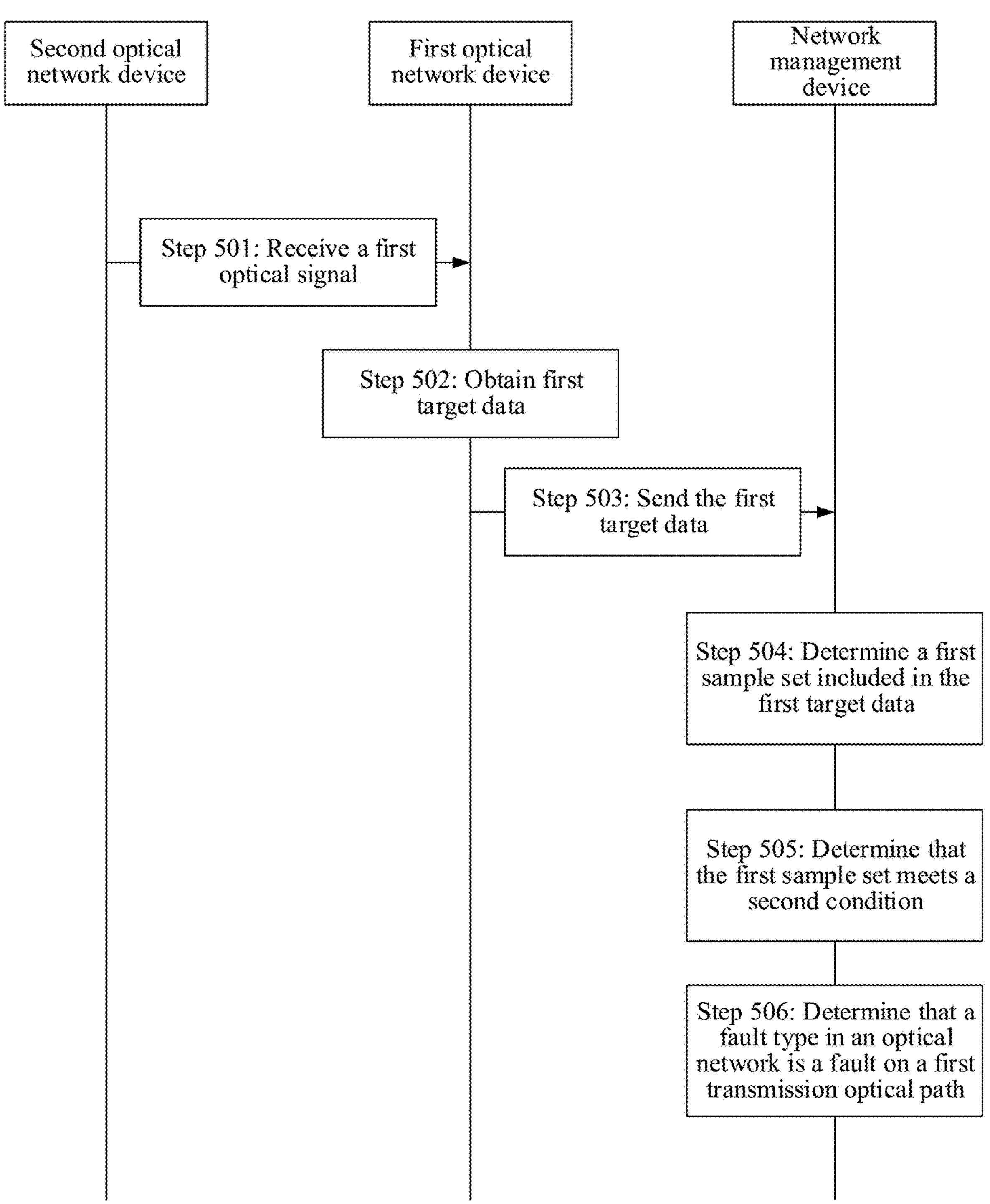
FIG. 5 is a flowchart of steps of a third fault locating method for an optical network according to an embodiment of this disclosure.

In Embodiment 1 and Embodiment 2, a fault on the power supply module can be located. The method described in this embodiment can locate a fault on a transmission optical path. For a specific performing process, refer to FIG. 5. FIG. 5 is a flowchart of steps of a third fault locating method for an optical network according to an embodiment of this disclosure.

Step 501: A first optical network device receives a first optical signal from a second optical network device.

Step 502: The first optical network device sequentially samples the first optical signal for a plurality of times, to obtain first target data.

Step 503: The first optical network device sends the first target data to a network management device.

Step 504: The network management device determines a first sample set included in the first target data.

For description of a performing process of step 501 to step 504 in this embodiment, refer to step 201 to step 204 in Embodiment 1. Details are not described again.

Step 505: The network management device determines that the first sample set meets a second condition.

The second condition is that a plurality of optical powers included in the first sample set show a downward change trend in a first fault locating time period, and the first fault locating time period is greater than a first time threshold used to determine a fault on a power supply module. For specific description of the first time threshold used to determine a fault on the power supply module, refer to Embodiment 1 or Embodiment 2. Details are not described herein again.

That the plurality of optical powers included in the first sample set show a downward change trend in the first fault locating time period may mean that the plurality of optical powers included in the first sample set in the first fault locating time period show a sequential decreasing change trend. That the plurality of optical powers included in the first sample set show a downward change trend in the first fault locating time period may further indicate that there are one or more fluctuations in the change trend of the plurality of optical powers included in the first sample set, but a waveform formed by the plurality of optical powers shows a downward trend as a whole.

Figure 6:
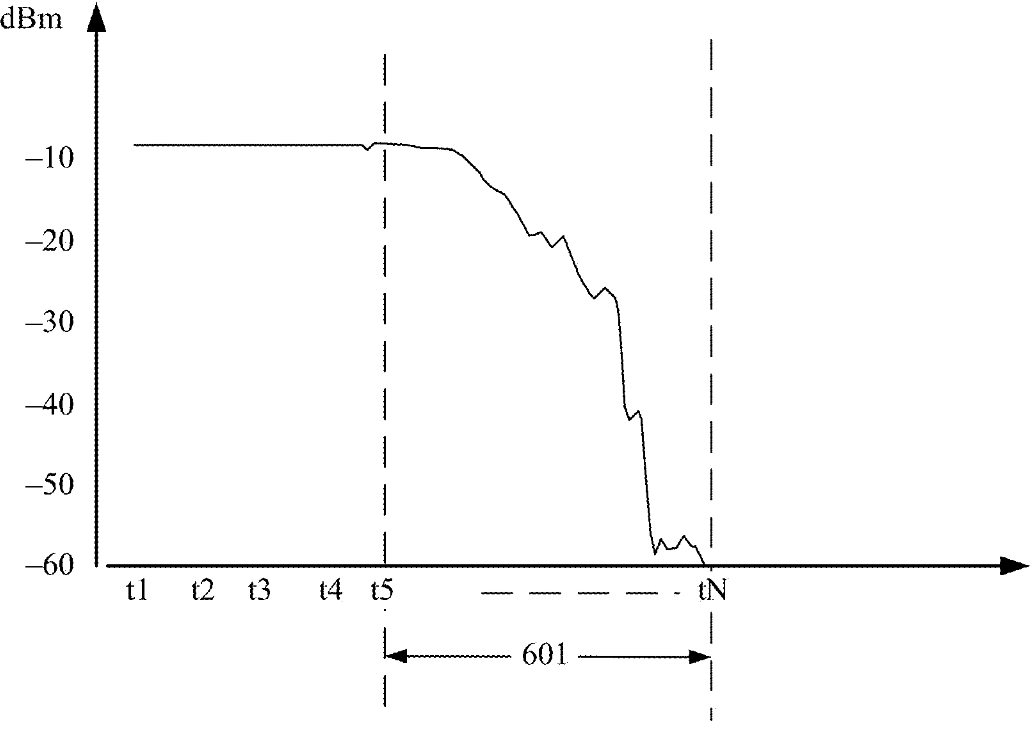
FIG. 6 is an example diagram of a second correspondence of first target data according to an embodiment of this disclosure.

Refer to FIG. 6. FIG. 6 is an example diagram of a second correspondence of the first target data according to an embodiment of this disclosure. For description of a coordinate system shown in FIG. 6, refer to FIG. 3. Details are not described again.

The network management device determines, in the first target data, that a plurality of optical powers corresponding to a first fault locating time period 601 show a downward change trend, and the plurality of optical powers included in the first fault locating time period 601 start to decrease at a start moment of the first fault locating time period 601, and decrease to an optical power threshold. As shown in FIG. 6, in the first fault locating time period 601, the plurality of optical powers decrease to the optical power threshold (−60 dBm) from the start sample moment of the first fault locating time period 601. In addition, the first fault locating time period 601 is greater than the first time threshold used to determine a fault on the power supply module. In this case, when the network management device determines that the plurality of optical powers corresponding to the first fault locating time period 601 meet the second condition, it may be learned that the plurality of optical powers corresponding to the first fault locating time period 601 are in the first sample set.

It can be learned, through comparison of the first sample set that meets the first condition shown in FIG. 3 with the second sample set that meets the second condition shown in FIG. 6, that in a process in which a plurality of optical powers decrease to the optical power threshold, the first fault locating time period corresponding to FIG. 3 is less than the first fault locating time period corresponding to FIG. 6. It can be learned that, compared with the plurality of optical powers corresponding to the first fault locating time period 303 shown in FIG. 3, the plurality of optical powers corresponding to the first fault locating time period 601 shown in FIG. 6 decrease flatly to the optical power threshold.

Step 506: The network management device determines that a fault type in the optical network is a fault on a first transmission optical path.

In this embodiment, when the network management device determines that the plurality of optical powers in the first sample set decrease to the power threshold in a time period greater than the first time threshold used to determine a fault on the power supply module, it indicates that a fault occurs on the first transmission optical path used to transmit the first optical signal.

With reference to FIG. 1, the first transmission optical path used to transmit the first optical signal includes the second branch optical path, the optical cable, and the first branch optical path. For specific description of the second branch optical path, the optical cable, and the first branch optical path, refer to FIG. 1. Details are not described again.

It can be learned that, when the network management device determines that the first sample set meets the second condition, a fault occurs on at least one of the fiber patch cord 151, the ODF 152, the fiber pigtail 153, the optical cable 130, the fiber pigtail 143, the ODF 141, and the fiber patch cord 142 included in the transmission optical path.

According to the method described in this embodiment, the network management device can directly locate a fault on the first transmission optical path based on the first target data from the first optical network device. This improves accuracy and efficiency of locating a fault on the first transmission optical path, and improves timeliness of locating a fault on the first transmission optical path. In the process of locating a fault on the first transmission optical path in this embodiment, a hardware device dedicated to fault locating does not need to be added in the optical network, to reduce network complexity and costs of locating a fault in the optical network. In addition, in a process in which the second optical network device sends the first optical signal to the first optical network device, a fault on the first transmission optical path is located, and a signal dedicated to fault locating does not need to be transmitted in the optical network, to avoid interference with the first optical signal that carries a service.

EMBODIMENT 4

Figure 7:
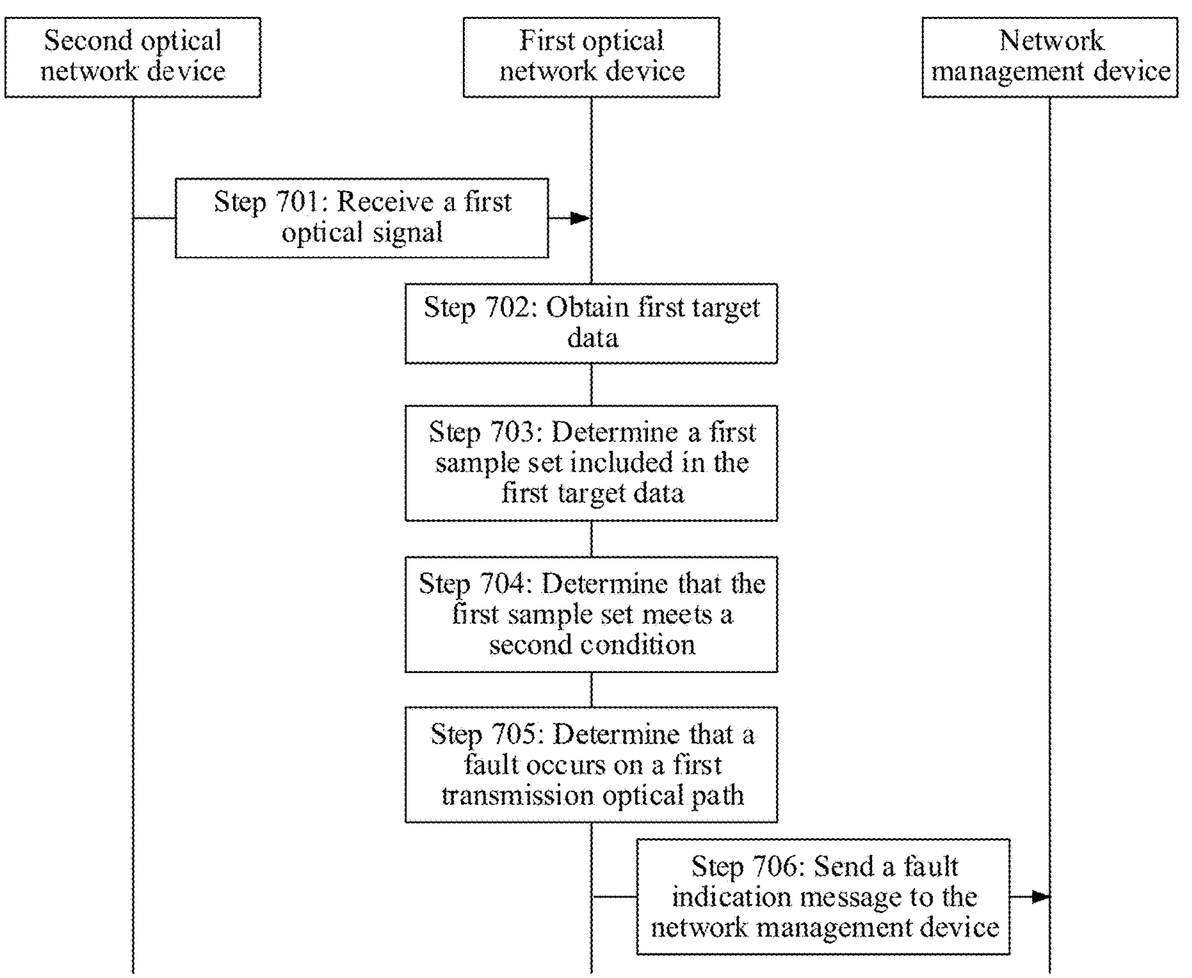
FIG. 7 is a flowchart of steps of a fourth fault locating method for an optical network according to an embodiment of this disclosure.

In Embodiment 3, the network management device determines whether a fault occurs on the first transmission optical path in the optical network. In this embodiment, the first optical network device determines whether a fault occurs on the first transmission optical path in the optical network. For the description of the performing process of this embodiment, refer to FIG. 7. FIG. 7 is a flowchart of steps of a fourth fault locating method for an optical network according to an embodiment of this disclosure.

Step 701: The first optical network device receives a first optical signal from a second optical network device.

Step 702: The first optical network device sequentially samples the first optical signal for a plurality of times, to obtain first target data.

For description of a performing process of step 701 and step 702 in this embodiment, refer to the description of step 501 and step 502 in Embodiment 3. Details are not described again.

Step 703: The first optical network device determines a first sample set included in the first target data.

For description of a process in which the first optical network device determines the first sample set included in the first target data in this embodiment, refer to the description of the process in which the network management device determines the first sample set included in the first target data in step 504 in Embodiment 3. Details are not described again.

Step 704: The first optical network device determines that the first sample set meets a second condition.

For the description of the process in which the first optical network device determines that the first sample set meets the second condition in this embodiment, refer to the description of the process in which the network management device determines that the first sample set meets the second condition in step 505 in Embodiment 3. Details are not described again.

Step 705: The first optical network device determines that a fault type in the optical network is a fault on a first transmission optical path.

For the description of determining, by the first optical network device, that a fault type in the optical network is a fault on the first transmission optical path in this embodiment, refer to the description of determining, by the network management device, that a fault type in the optical network is a fault on the first transmission optical path in step 506 in Embodiment 3. Details are not described again.

Step 706: The first optical network device sends a fault indication message to the network management device.

In this embodiment, when the first optical network device determines that a fault type in the optical network is a fault on the first transmission optical path, the first optical network device sends the fault indication message to the network management device. The fault indication message indicates that a fault occurs on the first transmission optical path.

When the network management device receives the fault indication message, the network management device can determine, based on the fault indication message, that a fault occurs on the first transmission optical path used to transmit the first optical signal.

According to the method described in this embodiment, the network management device directly determines, based on the fault indication message from the first optical network device, that a fault occurs on the first transmission optical path. This effectively improves accuracy and efficiency of locating a fault on the first transmission optical path, and improves timeliness of locating a fault on the first transmission optical path. The first optical network device locates a fault on the first transmission optical path, and this reduces a calculation amount of the network management device.

EMBODIMENT 5

Figure 8:
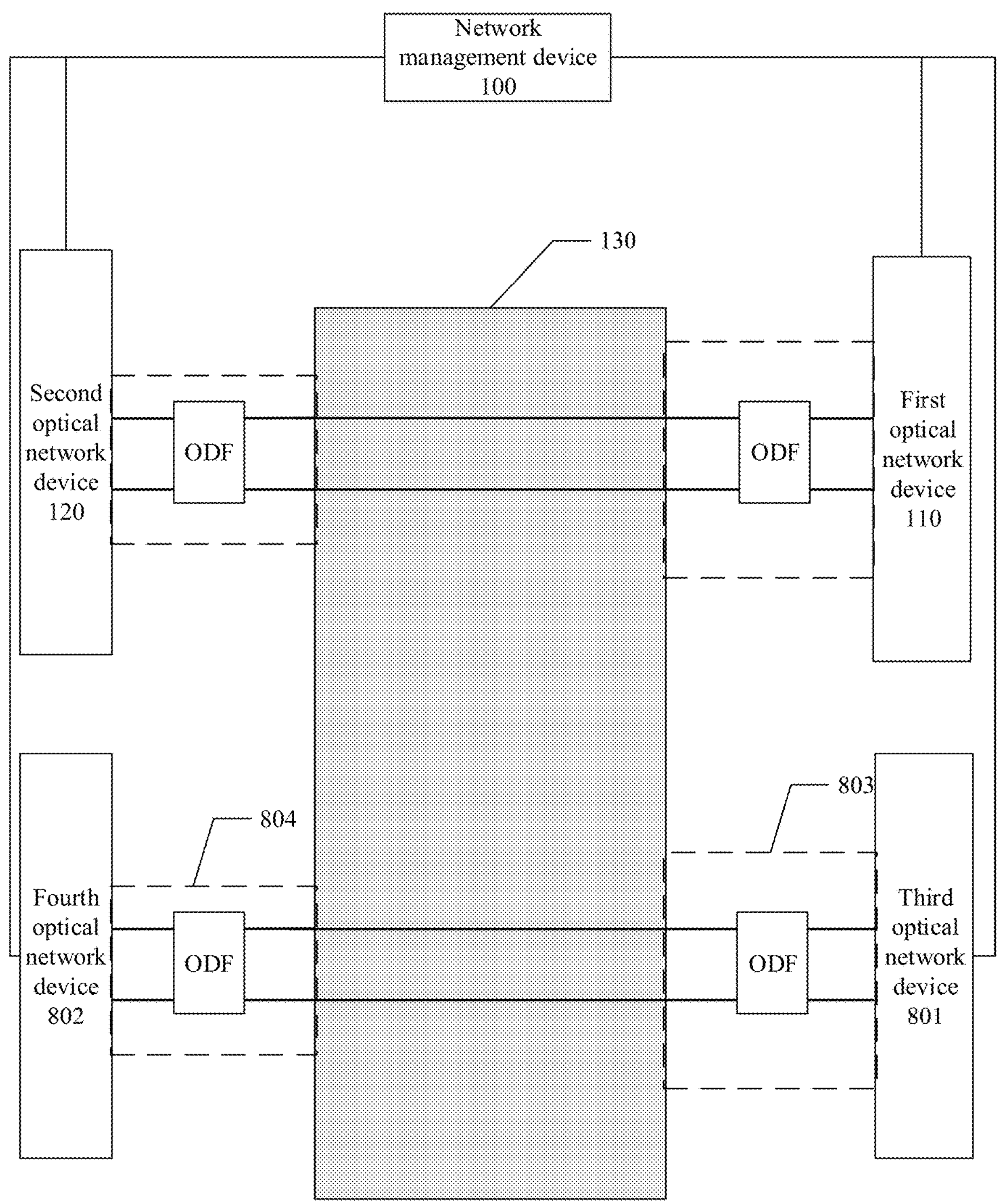
FIG. 8 is a second example diagram of a structure of an optical network according to this disclosure.

In Embodiment 3 and Embodiment 4, it can be determined that a fault occurs on the first transmission optical path. However, it can be determined, by using the method described in this embodiment, whether a fault on the first transmission optical path is caused by a fault on an optical cable. For a structure of an optical network to which the method provided in this embodiment is applied, refer to FIG. 8. FIG. 8 is an example diagram of a structure of a second optical network according to this disclosure.

For description of the network management device 100, the first optical network device 110, and the second optical network device 120 included in the optical network, and the transmission optical path connected between the first optical network device 110 and the second optical network device 120, refer to the description corresponding to FIG. 1. Details are not described again. The optical network further includes a third optical network device 801 and a fourth optical network device 802. A branch optical path 803 is connected between the third optical network device 801 and the optical cable 130, and a branch optical path 804 is connected between the fourth optical network device 802 and the optical cable 130. For description of the branch optical path 803 and the branch optical path 804, refer to the description of the first branch optical path and the second branch optical path corresponding to FIG. 1. Details are not described again. It can be learned that the optical cable 130 in this embodiment is configured to transmit an optical signal between the first optical network device 110 and the second optical network device 120, and the optical cable 130 is further configured to transmit an optical signal between the third optical network device 801 and the fourth optical network device 802.

Figure 9:
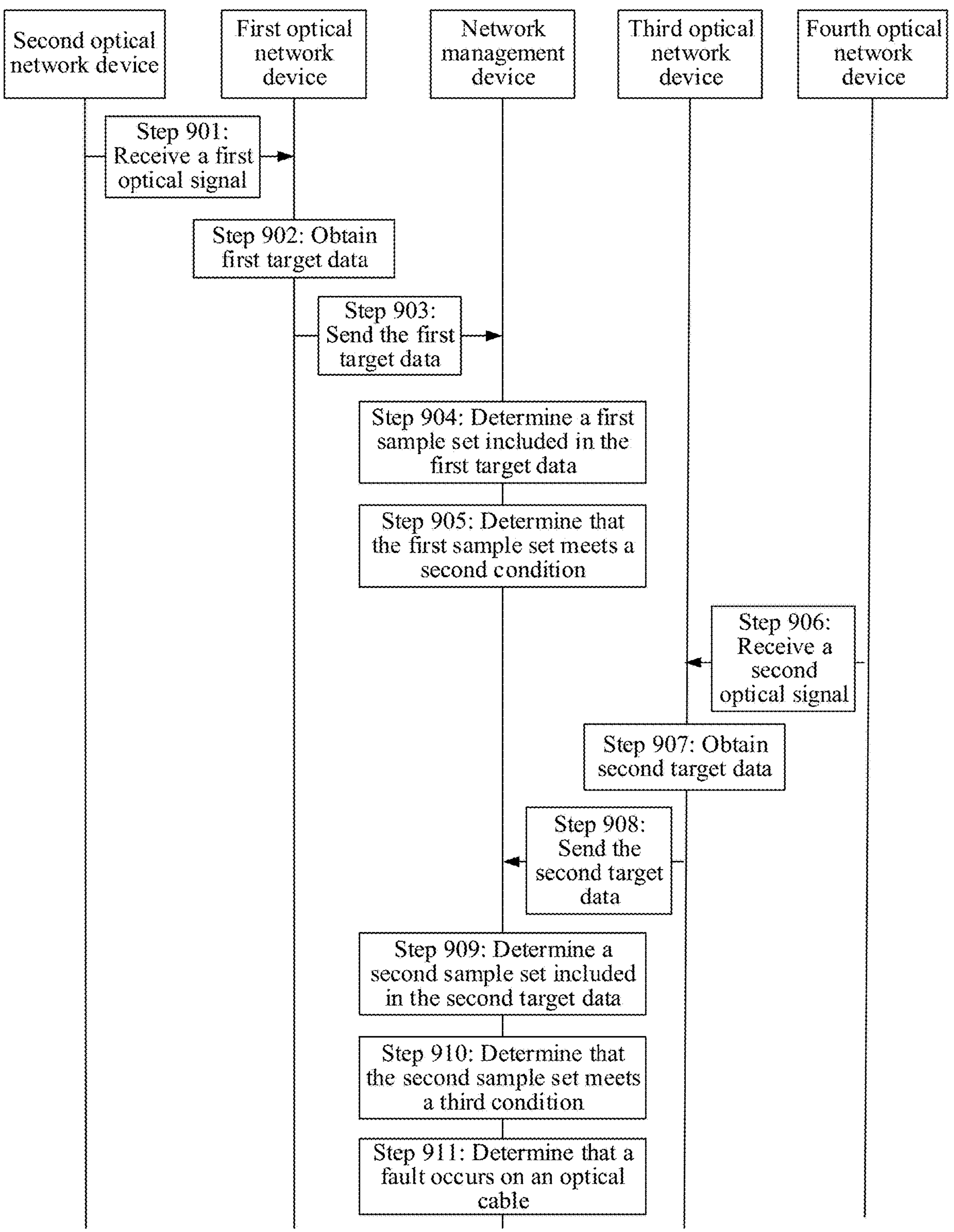
FIG. 9 is a flowchart of steps of a fifth fault locating method for an optical network according to an embodiment of this disclosure.

Based on the optical network shown in FIG. 8, for description of a specific performing process of a fault locating method for an optical network in this embodiment, refer to FIG. 9. FIG. 9 is a flowchart of steps of a fifth fault locating method for an optical network according to an embodiment of this disclosure.

Step 901: A first optical network device receives a first optical signal from a second optical network device.

Step 902: The first optical network device sequentially samples the first optical signal for a plurality of times, to obtain first target data.

Step 903: The first optical network device sends the first target data to a network management device.

Step 904: The network management device determines a first sample set included in the first target data.

Step 905: The network management device determines that the first sample set meets a second condition.

For description of a performing process of step 901 to step 905 in this embodiment, refer to step 501 to step 504 in Embodiment 3. A performing process is not described again.

Step 906: A third optical network device receives a second optical signal from a fourth optical network device.

In this embodiment, the fourth optical network device sends the second optical signal to the third optical network device sequentially through the branch optical path 804, the optical cable 130, and the branch optical path 803 shown in FIG. 8. A time sequence for performing step 901 and step 906 is not limited in this embodiment.

Step 907: The third optical network device sequentially samples the second optical signal for a plurality of times, to obtain second target data.

For description of a process in which the third optical network device samples the second optical signal, to obtain the second target data in this embodiment, refer to the description of the process in which the first optical network device samples the first optical signal, to obtain the second target data in step 202 in Embodiment 1. Details are not described again.

Step 908: The third optical network device sends the second target data to the network management device.

Step 909: The network management device determines a second sample set included in the second target data.

The network management device in this embodiment can monitor a change trend of a plurality of optical powers included in the second target data, to determine whether the second target data includes the second sample set. At least one optical power included in the second sample set in a second fault locating time period is less than or equal to an optical power threshold. It can be learned that the second sample set includes a plurality of optical powers obtained by the third optical network device by sequentially sampling the second optical signal for a plurality of times in the second fault locating time period. For description of the optical power threshold, refer to the description of step 204 in Embodiment 1. Details are not described again.

Step 910: The network management device determines that the second sample set meets a third condition.

The third condition is that the plurality of optical powers included in the second sample set show a downward change trend in the second fault locating time period, and the second fault locating time period is greater than a first time threshold used to determine a fault on a power supply module. For description of a process in which the second sample set meets the third condition, refer to the description of the process in which the first sample set meets the first condition in step 205 in Embodiment 1. Details are not described again.

Step 911: The network management device determines that a fault occurs on an optical cable.

In this embodiment, when the network management device determines that the first sample set corresponding to the first optical signal meets the first condition and the second sample set corresponding to the second optical signal meets the third condition, it indicates that a fault occurs on both a transmission optical path used to transmit the first optical signal and a transmission optical path used to transmit the second optical signal. Because the first optical signal and the second optical signal pass through the optical cable included in the optical network, the network management device determines there is a high probability that a fault occurs on the optical cable 130. The first optical signal transmitted through the optical cable meets the first condition and the second optical signal transmitted through the optical cable meets the third condition only when a fault occurs on the optical cable.

It can be learned that, when a fault occurs on the optical cable 130, a sample set corresponding to each optical signal transmitted through the optical cable 130 meets a condition that a plurality of optical powers show a downward change trend in a fault locating time period, and the fault locating time period is greater than the first time threshold used to determine a fault on the power supply module.

The description of a quantity of second optical signals in this embodiment is an optional example. For example, in another example, the fourth optical network device 802 may send a plurality of second optical signals to the third optical network device 801. If the plurality of second optical signals all meet the third condition, it indicates that there is a high probability that a fault occurs on the optical cable 130. It can be learned that a success rate of locating a fault on an optical cable by using the method described in this embodiment has a positive correlation with a quantity of optical signals that are transmitted through the optical cable and that meet the first condition or the third condition.

For another example, in this embodiment, an example in which the second optical signal is sent by the fourth optical network device 802 to the third optical network device 801 is used for description. In another example, the second optical signal may also be sent by the third optical network device to the fourth optical network device.

According to the method described in this embodiment, the network management device locates a fault on the optical cable based on target data from a plurality of optical network devices. This improves accuracy and efficiency of locating a fault on the optical cable, and improves timeliness of locating a fault on the optical cable. In addition, in a process of locating a fault on the optical cable, a hardware device dedicated to locating a fault on the optical cable does not need to be added in the optical network, to reduce network complexity and costs of locating a fault on the optical cable. In addition, in the process of locating a fault on the optical cable, a signal dedicated to locating a fault on the optical cable does not need to be transmitted in the optical network, to avoid interference with an optical signal that has carried a service and that is transmitted through the optical cable.

EMBODIMENT 6

Figure 10:
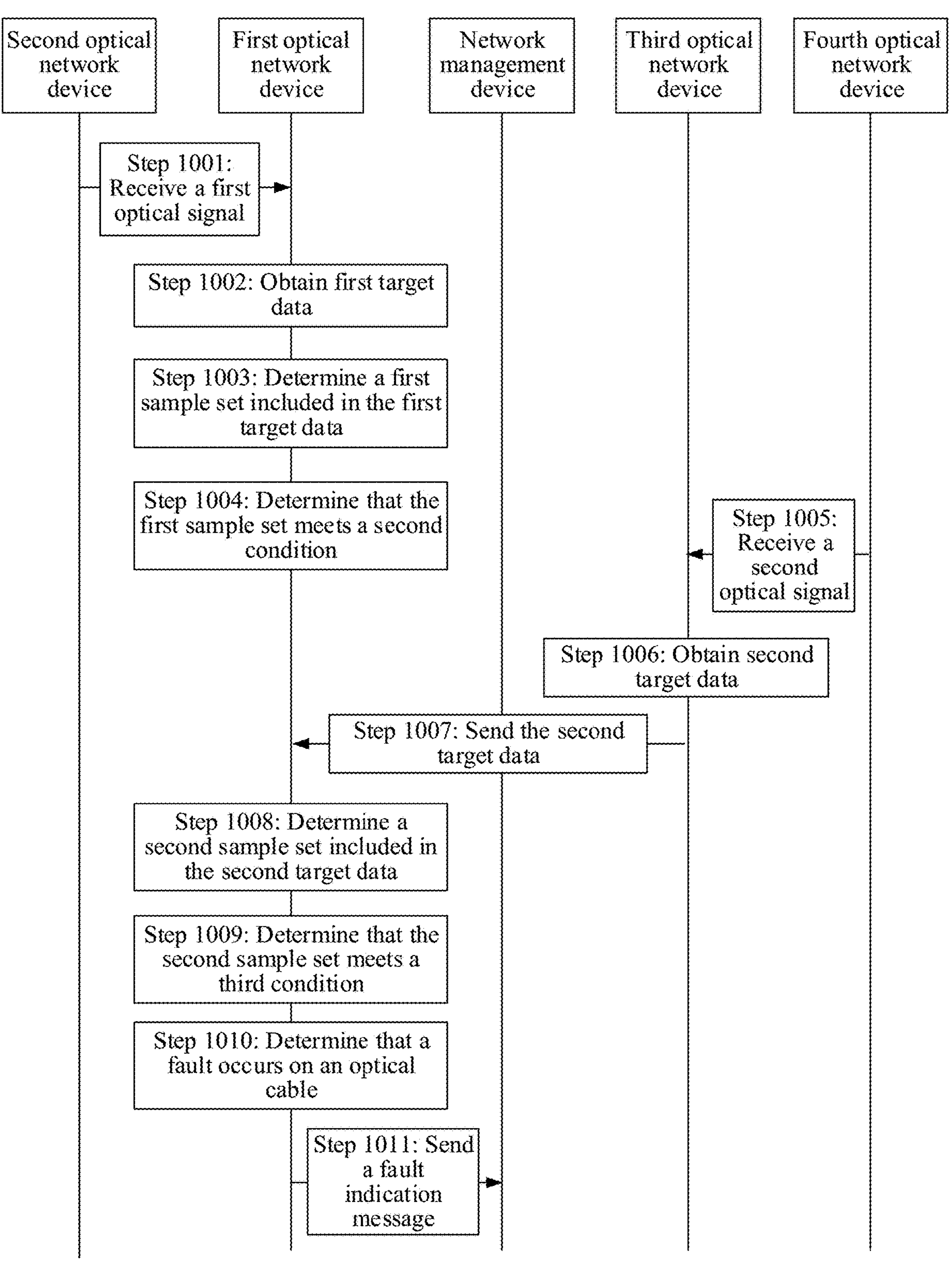
FIG. 10 is a flowchart of steps of a sixth fault locating method for an optical network according to an embodiment of this disclosure.

In Embodiment 5, an example in which the network management device determines that a fault occurs on the optical cable is used for description. In this embodiment, an example in which the first optical network device determines that a fault occurs on the optical cable is used for description. For a structure of an optical network to which the method described in this embodiment is applied, refer to FIG. 8. Details are not described in this embodiment. For a performing process of the method described in this embodiment, refer to FIG. 10. FIG. 10 is a flowchart of steps of a sixth fault locating method for an optical network according to an embodiment of this disclosure.

Step 1001: The first optical network device receives a first optical signal from a second optical network device.

Step 1002: The first optical network device sequentially samples the first optical signal for a plurality of times, to obtain first target data.

For description of a performing process of step 1001 and step 1002 in this embodiment, refer to step 901 and step 902 in Embodiment 5. Details are not described again.

Step 1003: The first optical network device determines a first sample set included in the first target data.

For description of a specific process in which the first optical network device determines the first sample set included in the first target data in this embodiment, refer to the description of the process in which the network management device determines the first sample set included in the first target data in step 904 in Embodiment 5. Details are not described again.

Step 1004: The first optical network device determines that the first sample set meets a second condition.

For the description of the process in which the first optical network device determines that the first sample set meets the second condition in this embodiment, refer to the description of the process in which the network management device determines that the first sample set meets the second condition in step 905 in Embodiment 5. Details are not described again.

Step 1005: A third optical network device receives a second optical signal from a fourth optical network device.

A time sequence for performing step 1005 and step 1001 is not limited in this embodiment.

Step 1006: The third optical network device sequentially samples the second optical signal for a plurality of times, to obtain second target data.

For description of a performing process of step 1005 and step 1006 in this embodiment, refer to the description of the process of step 906 and step 907 in Embodiment 5. Details are not described again.

Step 1007: The third optical network device sends the second target data to the first optical network device.

A difference between this embodiment and Embodiment 5 lies in that the first optical network device is responsible for fault locating. Therefore, the third optical network device sends the second target data to the first optical network device.

Step 1008: The first optical network device determines a second sample set included in the second target data.

For description of a process in which the first optical network device determines the second sample set included in the second target data in this embodiment, refer to the description of the process in which the network management device determines the second sample set included in the second target data in step 909 in Embodiment 5. Details are not described again.

Optionally, this embodiment is described by using an example in which the third optical network device sends the second target data to the first optical network device. In another example, the third optical network device may directly send the second sample set to the first optical network device. This is not specifically limited.

Step 1009: The first optical network device determines that the second sample set meets a third condition.

For description of a process in which the first optical network device determines that the second sample set meets the third condition in this embodiment, refer to the description of the process in which the network management device determines that the second sample meets the third condition in step 910 in Embodiment 5. Details are not described again.

Step 1010: The first optical network device determines that a fault occurs on an optical cable.

In this embodiment, when the first optical network device determines that the first sample set corresponding to the first optical signal meets the first condition, and the second sample set corresponding to the second optical signal meets the third condition, the first optical network device determines that a fault occurs on the optical cable. For specific description, refer to step 911 in Embodiment 5. Details are not described again.

Step 1011: The first optical network device sends a fault indication message to the network management device.

In this embodiment, when the first optical network device determines that a fault type in the optical network is a fault on the optical cable, the first optical network device sends the fault indication message to the network management device. The fault indication message indicates that a fault occurs on the optical cable.

According to the method described in this embodiment, the first optical network device can determine, based on a plurality of pieces of different target data, that a fault occurs on the optical cable. This improves accuracy and efficiency of locating a fault on the optical cable, and improves timeliness of locating a fault on the optical cable. In addition, in a process of locating a fault on the optical cable, a hardware device dedicated to locating a fault on the optical cable does not need to be added in the optical network, to reduce network complexity and costs of locating a fault on the optical cable. In addition, in the process of locating a fault on the optical cable, a signal dedicated to locating a fault on the optical cable does not need to be transmitted in the optical network, to avoid interference with an optical signal that has carried a service and that is transmitted through the optical cable. The first optical network device is responsible for locating a fault on the optical cable, and this reduces a calculation amount of the network management device for locating a fault on the optical cable.

EMBODIMENT 7

Figure 11:
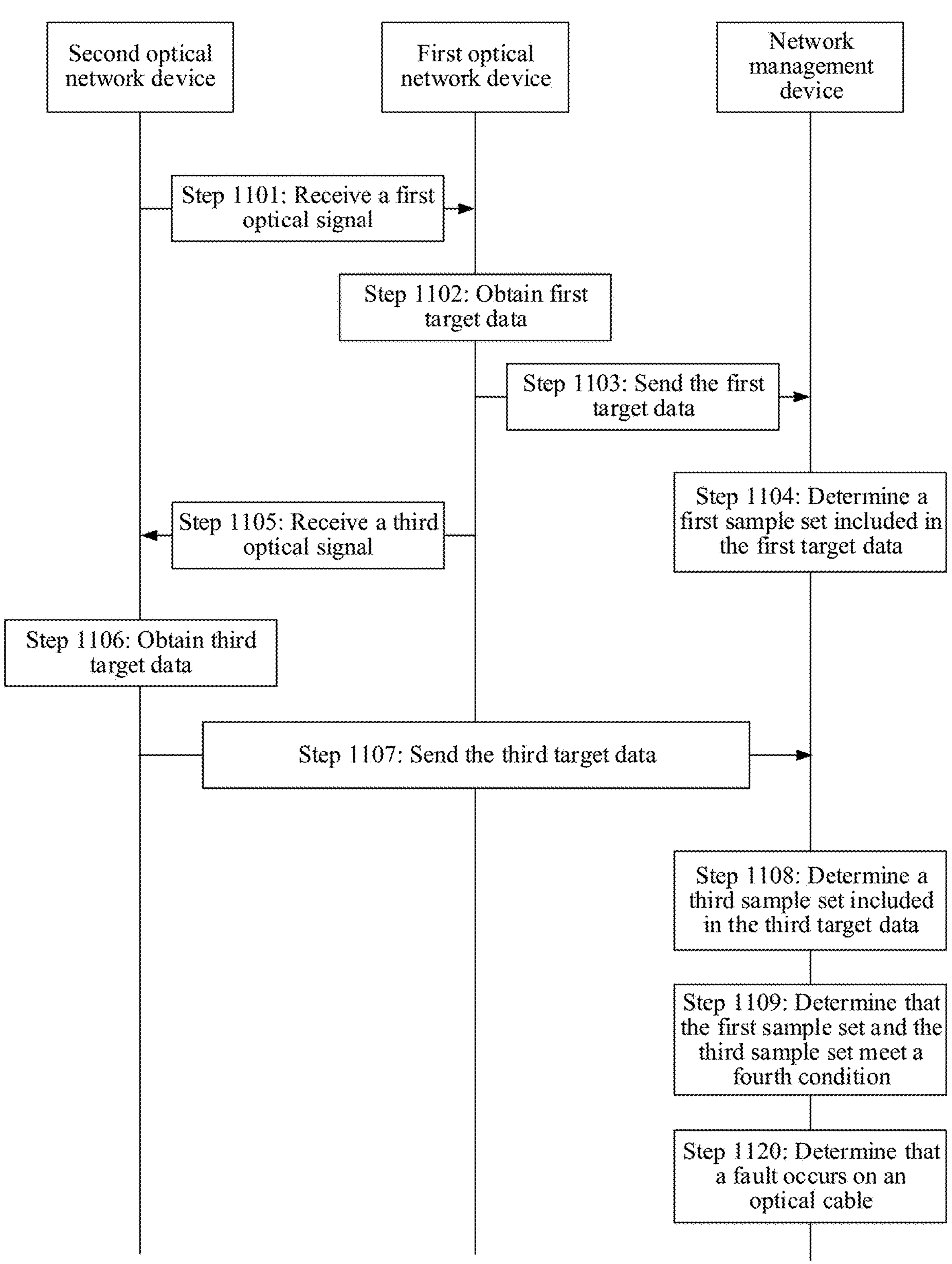
FIG. 11 is a flowchart of steps of a seventh fault locating method for an optical network according to an embodiment of this disclosure.

A network management device in this embodiment can locate, based on a first optical network device and a second optical network device that transmit optical signals to each other, whether a fault occurs on a transmission optical path between the first optical network device and the second optical network device, and locate a specific location in which a fault occurs on the transmission optical path. For a specific performing process, refer to FIG. 11. FIG. 11 is a flowchart of steps of a seventh fault locating method for an optical network according to an embodiment of this disclosure.

Step 1101: The first optical network device receives a first optical signal from the second optical network device.

Step 1102: The first optical network device sequentially samples the first optical signal for a plurality of times, to obtain first target data.

Step 1103: The first optical network device sends the first target data to the network management device.

Step 1104: The network management device determines a first sample set included in the first target data.

For description of a performing process of step 1101 to step 1104 in this embodiment, refer to the description of the performing process of step 201 to step 204 in Embodiment 1. The specific performing process is not described.

Step 1105: The second optical network device receives a third optical signal from the first optical network device.

The first optical network device in this embodiment sends the third optical signal to the second optical network device sequentially through a third branch optical path, an optical cable, and a fourth branch optical path. For specific description of the third branch optical path, the optical cable, and the fourth branch optical path, refer to FIG. 1. Details are not described again. A time sequence for performing step 1101 and step 1105 is not limited in this embodiment.

Step 1106: The second optical network device sequentially samples the third optical signal, to obtain third target data.

For a process in which the second optical network device sequentially samples the third optical signal to obtain the third target data in this embodiment, refer to the process in which the first optical network device samples the first optical signal for a plurality of times to obtain the first target data in step 202 in Embodiment 1. Details are not described again.

Step 1107: The second optical network device sends the third target data to the network management device.

Step 1108: The network management device determines a third sample set included in the third target data.

The network management device in this embodiment can monitor a change trend of a plurality of optical powers included in the third target data, to determine whether the third target data includes the third sample set. At least one optical power included in the third sample set in a third fault locating time period is less than or equal to an optical power threshold. It can be learned that the first sample set includes a plurality of optical powers obtained by the second optical network device by sequentially sampling the third optical signal for a plurality of times in the third fault locating time period. For description of the optical power threshold, refer to step 204 in Embodiment 1. Details are not described again.

This embodiment is described by using an example in which the second optical network device sends the third target data to the network management device. In another example, the second optical network device may also directly send the third sample set to the network management device.

Step 1109: The network management device determines that the first sample set and the third sample set meet a fourth condition.

The fourth condition is that a plurality of optical powers included in the first sample set show a downward change trend in a first fault locating time period, the plurality of optical powers included in the third sample set show a downward change trend in the third fault locating time period, and both the first fault locating time period and the third fault locating time period are greater than a first time threshold used to determine a fault on a power supply module.

For specific description that the plurality of optical powers included in the first sample set show a downward change trend in the first fault locating time period, and specific description that the plurality of optical powers included in the third sample set show a downward change trend in the third fault locating time period, refer to the description that the plurality of optical powers in the first fault locating time period show a downward change trend in step 505 in Embodiment 3. Details are not described again.

In this embodiment, the first fault locating time period and the third fault locating time period at least partially overlap, or a time interval between the first fault locating time period and the third fault locating time period is less than or equal to a second time threshold. Duration of the second time threshold is not limited in this embodiment, provided that the first fault locating time period and the third fault locating time period are close when the time interval between the first fault locating time period and the third fault locating time period is less than or equal to the second time threshold. This embodiment is described by using an example in which the first fault locating time period and the third fault locating time period overlap.

Figure 12:
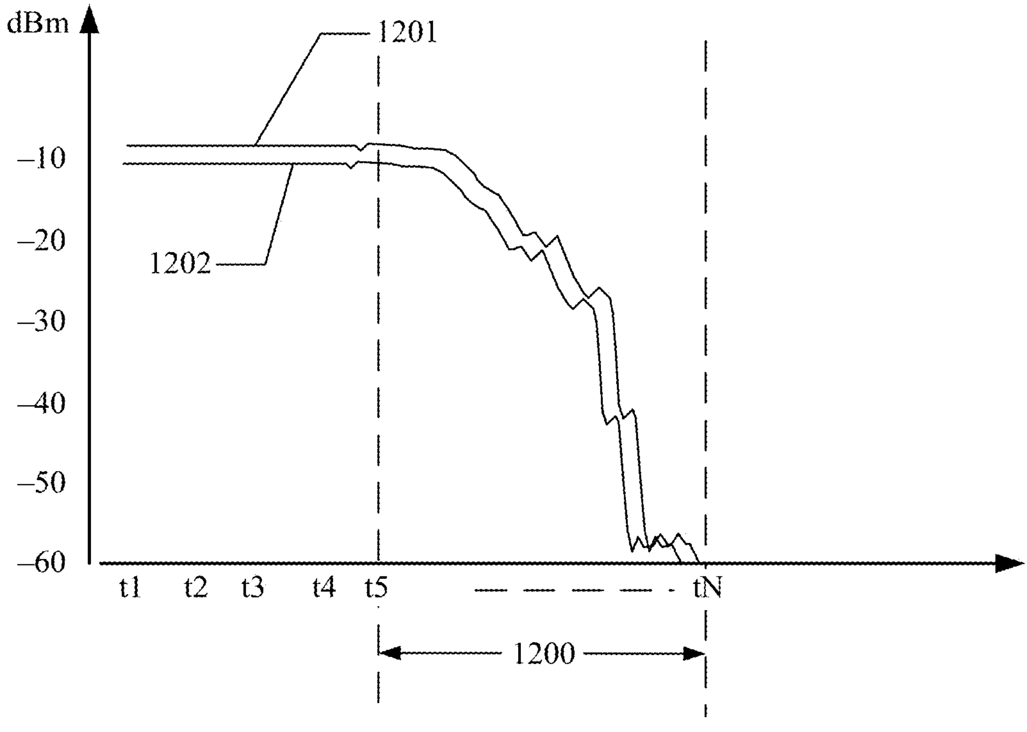
FIG. 12 is a first example diagram of a correspondence of first target data and a correspondence of third target data according to an embodiment of this disclosure.

For example, FIG. 12 is a first example diagram of a correspondence of the first target data and a correspondence of the third target data according to an embodiment of this disclosure. The network management device determines that the first target data from the first optical network device is first target data 1201 shown in FIG. 12. The network management device further determines that the third target data from the second optical network device is third target data 1202 shown in FIG. 12. In this case, that the first sample set and the third sample set meet the fourth condition specifically means that the first sample set included in the first target data 1201 shows a downward change trend in the first fault locating time period. The third sample set included in the third target data 1202 also shows a downward change trend in the third fault locating time period. The first fault locating time period and the third fault locating time period overlap, and both are a time period 1200 shown in FIG. 12. The time period 1200 is greater than the first time threshold used to determine a fault on the power supply module. As shown in FIG. 12, it can be learned that both the first sample set and the third sample set show a downward change trend in a same time period.

Step 1120: The network management device determines that a fault occurs on an optical cable.

In a process of transmitting the first optical signal along a first transmission optical path and a process of transmitting the third optical signal along a second transmission optical path in this embodiment, if the fourth condition is met, it indicates that a fault occurs on both the first transmission optical path and the second transmission optical path. In addition, because the first fault locating time period and the third fault locating time period overlap, it indicates that a fault occurs when the first optical signal and the third optical signal are transmitted to a same location along the first transmission optical path along the second transmission optical path, and consequently, the first sample set and the third sample set meet the fourth condition.

A branch optical path included in the first transmission optical path is different from a branch optical path included in the second transmission optical path. The same location of the first transmission optical path and the second transmission optical path is an optical cable through which the first transmission optical path and the second transmission optical path pass. When the first sample set and the third sample set meet the fourth condition, and the first fault locating time period and the third fault locating time period overlap, it indicates that a fault occurs on the optical cable.

According to the method described in this embodiment, the network management device directly locates a fault on the optical cable based on the first target data from the first optical network device and the third target data from the second optical network device. This improves accuracy and efficiency of locating a fault on the optical cable, and improves timeliness of locating a fault on the optical cable. In the process of locating a fault on the optical cable in this embodiment, a hardware device dedicated to locating a fault on the optical cable does not need to be added in the optical network, to reduce network complexity and costs of locating a fault in the optical network.

EMBODIMENT 8

Figure 13:
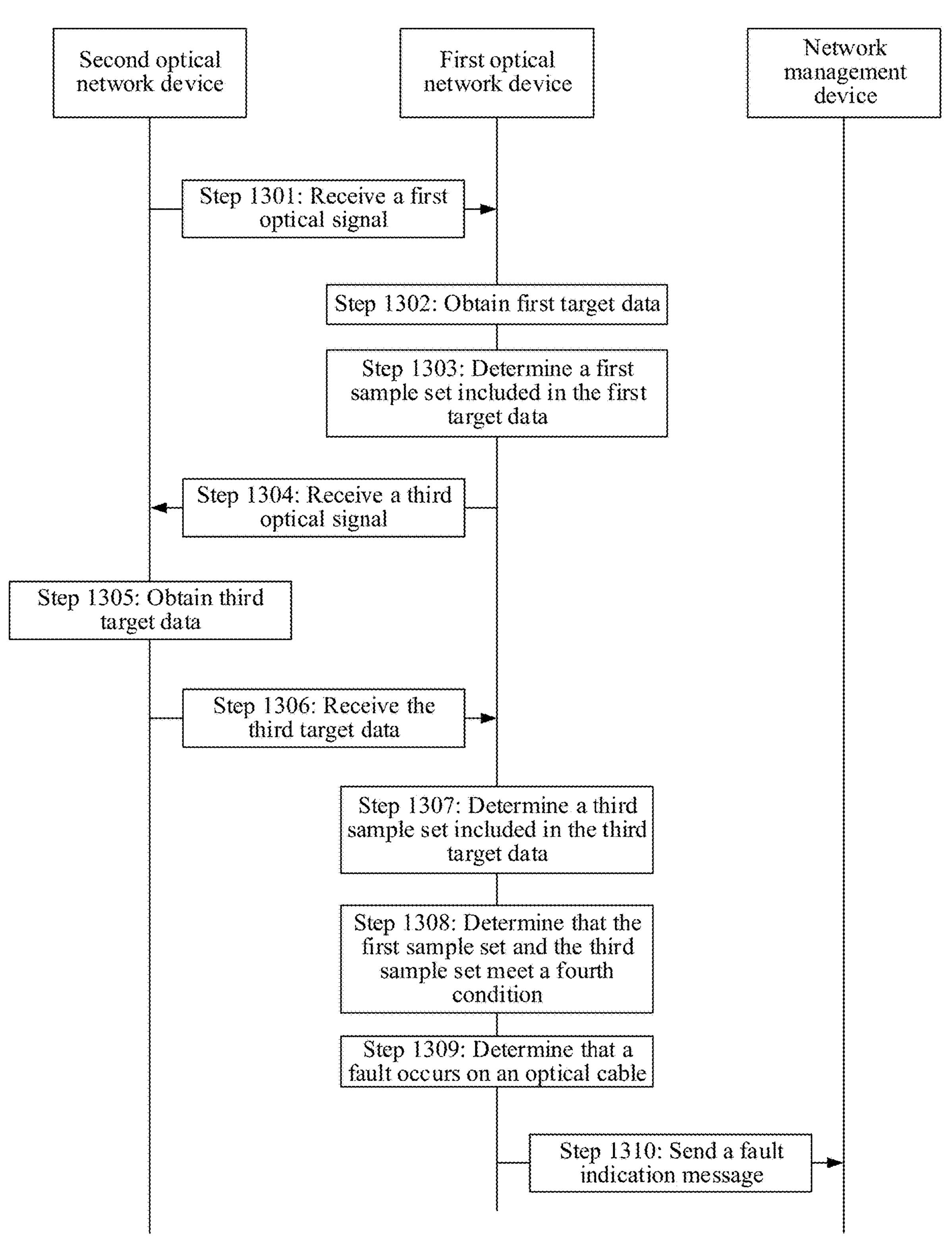
FIG. 13 is a flowchart of steps of an eighth fault locating method for an optical network according to an embodiment of this disclosure.

In Embodiment 7, the network management device can locate a fault on the optical cable based on the first optical network device and the second optical network device that transmit optical signals to each other. In this embodiment, the first optical network device can locate whether a fault occurs on the optical cable. For a specific performing process, refer to FIG. 13. FIG. 13 is a flowchart of steps of an eighth fault locating method for an optical network according to an embodiment of this disclosure.

Step 1301: The first optical network device receives a first optical signal from the second optical network device.

Step 1302: The first optical network device sequentially samples the first optical signal for a plurality of times, to obtain first target data.

For description of a performing process of step 1301 and step 1302 in this embodiment, refer to step 1101 and step 1102 in Embodiment 7. A performing process is not described again.

Step 1303: The first optical network device determines a first sample set included in the first target data.

For description of a process in which the first optical network device determines the first sample set included in the first target data in this embodiment, refer to the description of the process in which the network management device determines the first sample set included in the first target data in step 1104 in Embodiment 7. Details are not described again.

Step 1304: The second optical network device receives a third optical signal from the first optical network device.

Step 1305: The second optical network device sequentially samples the third optical signal, to obtain third target data.

For description of a performing process of step 1304 and step 1305 in this embodiment, refer to the description of the process of step 1105 and step 1106 in Embodiment 7. Details are not described again.

Step 1306: The first optical network device receives the third target data sent by the second optical network device.

Step 1307: The first optical network device determines a third sample set included in the third target data.

For description of a process in which the first optical network device determines the third sample set included in the third target data in this embodiment, refer to the description of the process in which the network management device determines the third sample set included in the third target data in step 1108 in Embodiment 7. Details are not described again.

This embodiment is described by using an example in which the second optical network device sends the third target data to the first optical network device. In another example, the second optical network device may also directly send the third sample set to the first optical network device.

Step 1308: The first optical network device determines that the first sample set and the third sample set meet a fourth condition.

The first optical network device in this embodiment can determine whether the first sample set and the third sample set meet the fourth condition. For specific description that the first sample set and the third sample set meet the fourth condition, refer to step 1109 in Embodiment 7. Details are not described again.

Step 1309: The first optical network device determines that a fault occurs on an optical cable.

For description of a process in which the first optical network device determines that a fault occurs on the optical cable in this embodiment, refer to the description of the process in which the network management device determines that a fault occurs on the optical cable in step 1120 in Embodiment 7. Details are not described again.

Step 1310: The first optical network device sends a fault indication message to the network management device.

In this embodiment, when the first optical network device determines that a fault type in the optical network is a fault on the optical cable, the first optical network device sends the fault indication message to the network management device. The fault indication message indicates that a fault occurs on the optical cable.

According to the method described in this embodiment, the network management device directly determines, based on the fault indication message from the first optical network device, that a fault occurs on the optical cable. This improves accuracy and efficiency of locating a fault on the optical cable, and improves timeliness of locating a fault on the optical cable. In addition, a calculation amount of the network management device is reduced during locating a fault on the optical cable.

EMBODIMENT 9

Figure 14:
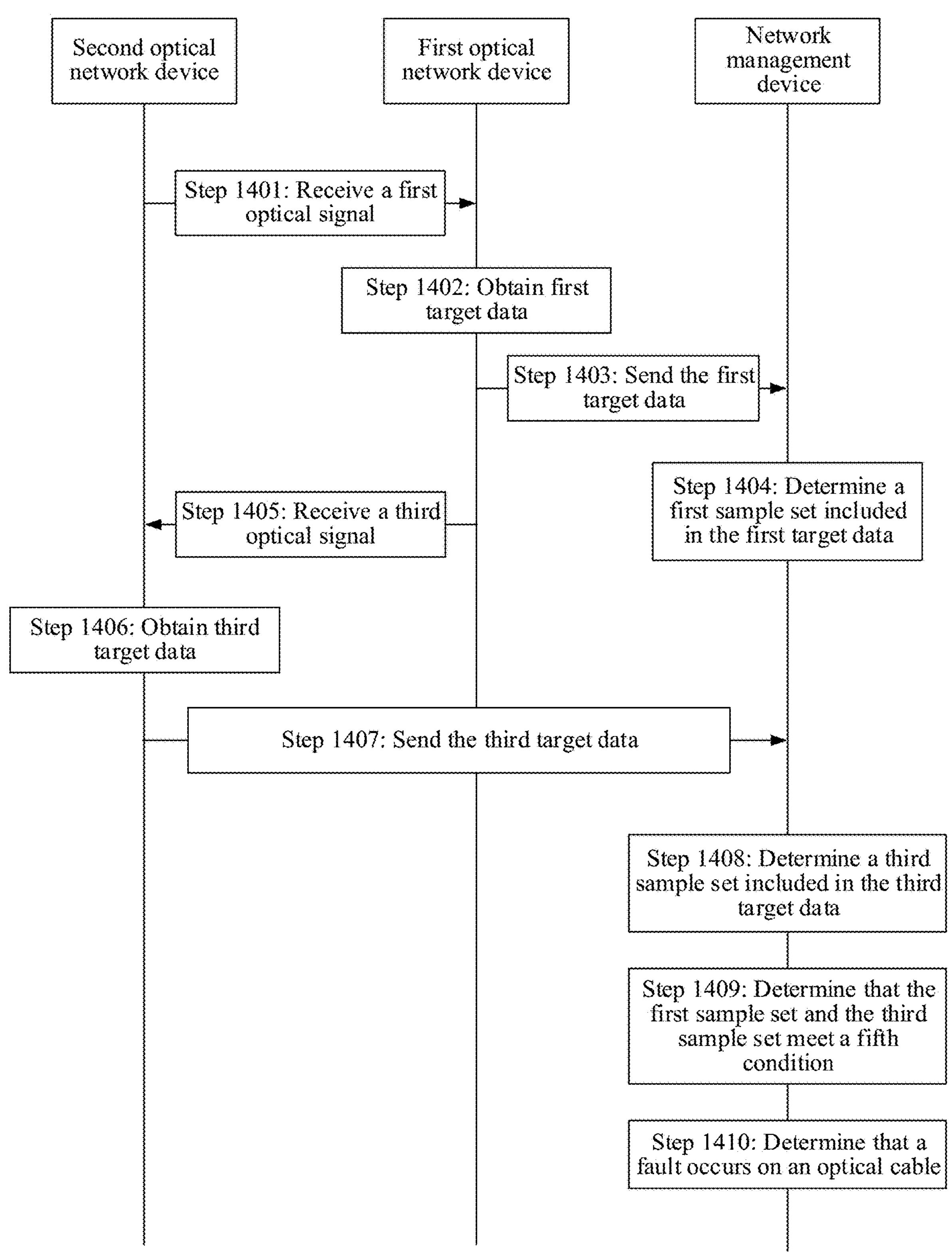
FIG. 14 is a flowchart of steps of a ninth fault locating method for an optical network according to an embodiment of this disclosure.

A network management device in this embodiment can locate, based on a first optical network device and a second optical network device that transmit optical signals to each other, whether a fault occurs on an optical cable. A condition for locating a fault on the optical cable by the network management device in this embodiment is different from the condition for locating a fault on the optical cable by the network management device in Embodiment 7. For a specific performing process, refer to FIG. 14. FIG. 14 is a flowchart of steps of a ninth fault locating method for an optical network according to an embodiment of this disclosure.

Step 1401: The first optical network device receives a first optical signal from the second optical network device.

Step 1402: The first optical network device sequentially samples the first optical signal for a plurality of times, to obtain first target data.

Step 1403: The first optical network device sends the first target data to the network management device.

Step 1404: The network management device determines a first sample set included in the first target data.

Step 1405: The second optical network device receives a third optical signal from the first optical network device.

Step 1406: The second optical network device sequentially samples the third optical signal, to obtain third target data.

Step 1407: The second optical network device sends the third target data to the network management device.

Step 1408: The network management device determines a third sample set included in the third target data.

For description of a performing process of step 1401 to step 1408 in this embodiment, refer to the description of the process of step 1101 to step 1108 in Embodiment 7. Details are not described again.

Step 1409: The network management device determines that the first sample set and the third sample set meet a fifth condition.

The fifth condition is that a plurality of optical powers included in the first sample set show a downward change trend in a first fault locating time period, a change trend of a plurality of optical powers included in the third sample set fluctuates in a third fault locating time period, and both the first fault locating time period and the third fault locating time period are greater than a first time threshold used to determine a fault on a power supply module. For description of the first time threshold, refer to step 205 in Embodiment 1. Details are not described again.

In this embodiment, that a change trend of the third sample set fluctuates means that one or more troughs exist in the third sample set in the third fault locating time period, and an optical power corresponding to each trough is greater than an optical power threshold. It can be learned that, in a transmission process of the third optical signal, because an external force or interference such as engineering construction exists on a second transmission optical path, a change trend of optical powers of the third optical signal transmitted along the second transmission optical path fluctuates. However, because any optical power included in the third sample set is greater than the optical power threshold, it indicates that the third optical signal is normally transmitted along the second transmission optical path.

For specific description that the plurality of optical powers included in the first sample set show a downward change trend in the first fault locating time period, refer to the description that the plurality of optical powers show a downward change trend in the first fault locating time period in step 505 in Embodiment 3. Details are not described again.

In this embodiment, the first fault locating time period and the third fault locating time period at least partially overlap, or a time interval between the first fault locating time period and the third fault locating time period is less than or equal to a second time threshold. For details, refer to step 1109 in Embodiment 7. Details are not described again. This embodiment is described by using an example in which the first fault locating time period and the third fault locating time period overlap.

Figure 15:
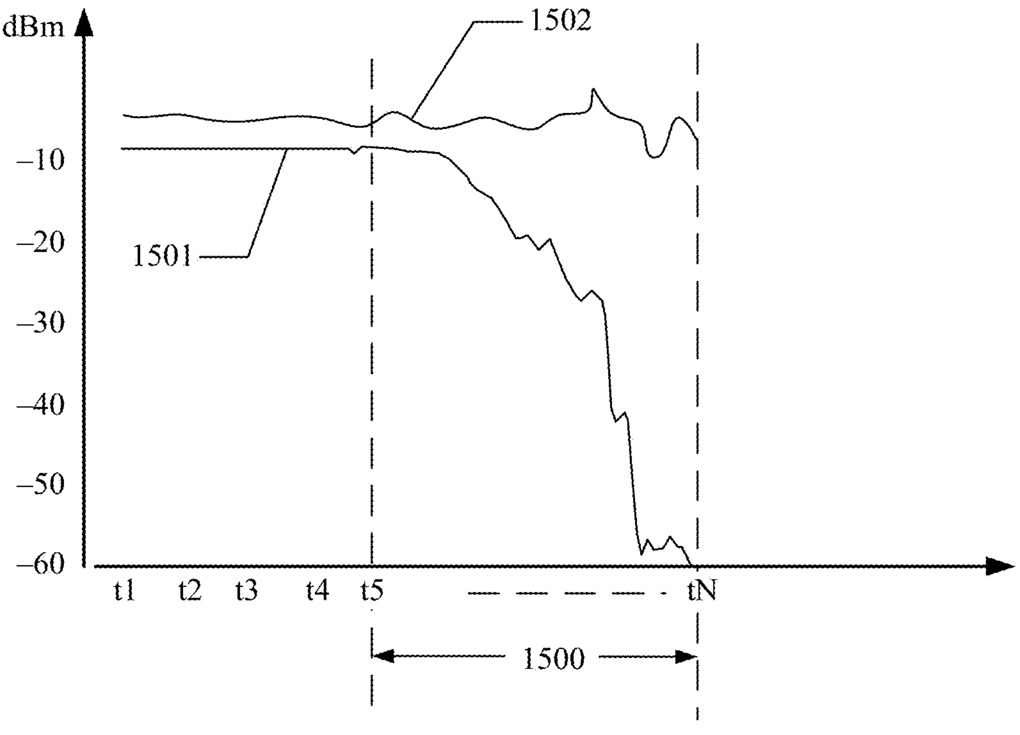
FIG. 15 is a second example diagram of a correspondence of first target data and a correspondence of third target data according to an embodiment of this disclosure.

For example, FIG. 15 is a second example diagram of a correspondence of the first target data and a correspondence of the third target data according to an embodiment of this disclosure. The network management device determines that the first target data from the first optical network device is first target data 1501 shown in FIG. 15. The network management device further determines that the third target data from the second optical network device is third target data 1502 shown in FIG. 15. In this case, that the first sample set and the third sample set meet the fifth condition specifically means that the first sample set included in the first target data 1501 shows a downward change trend in the first fault locating time period. A change trend of the third sample set included in the third target data 1502 fluctuates in the third fault locating time period. The first fault locating time period and the third fault locating time period overlap, and both are a time period 1500 shown in FIG. 15. The time period 1500 is greater than the first time threshold used to determine a fault on the power supply module. An optical power corresponding to any trough of the third sample set in the third fault locating time period is greater than the optical power threshold (for example, 60 dBm). It can be learned that a time period in which a waveform of the first sample set shows a downward trend coincides with a time period in which a waveform of the second sample set fluctuates due to external force or interference.

Step 1410: The network management device determines that a fault occurs on an optical cable.

In a process of transmitting the first optical signal along a first transmission optical path and a process of transmitting the third optical signal along the second transmission optical path in this embodiment, the fifth condition is met. It indicates that a time period in which a fault occurs on the first transmission optical path coincides with a time period in which an external force action or an interference action occurs on the second transmission optical path. That is, the first fault locating time period coincides with the third fault locating time period. Therefore, in the first fault locating time period in which a fault occurs on the first transmission optical path, the optical power of the transmitted third optical signal fluctuates due to external force or interference on the second transmission optical path. In this case, it indicates that a fault occurs on a fiber core that is included in the optical cable and that is used to transmit the first optical signal, but optical powers of the third optical signal transmitted on a fiber core that is used to transmit the third optical signal fluctuate in the third fault locating time period due to an external force or interference.

It can be learned that, in this example, the network management device determines that a fault occurs on the optical cable, and can determine that a fault occurs on the fiber core that is in the optical cable and that is used to transmit the first optical signal.

According to the method described in this embodiment, the network management device locates a fault on the optical cable based on the first target data from the first optical network device and the third target data from the second optical network device. This improves accuracy and efficiency of locating a fault on the optical cable, and improves timeliness of locating a fault on the optical cable. In the process of locating a fault on the optical cable in this embodiment, a hardware device dedicated to locating a fault on the optical cable does not need to be added in the optical network, to reduce network complexity and costs of locating a fault in the optical network.

EMBODIMENT 10

Figure 16:
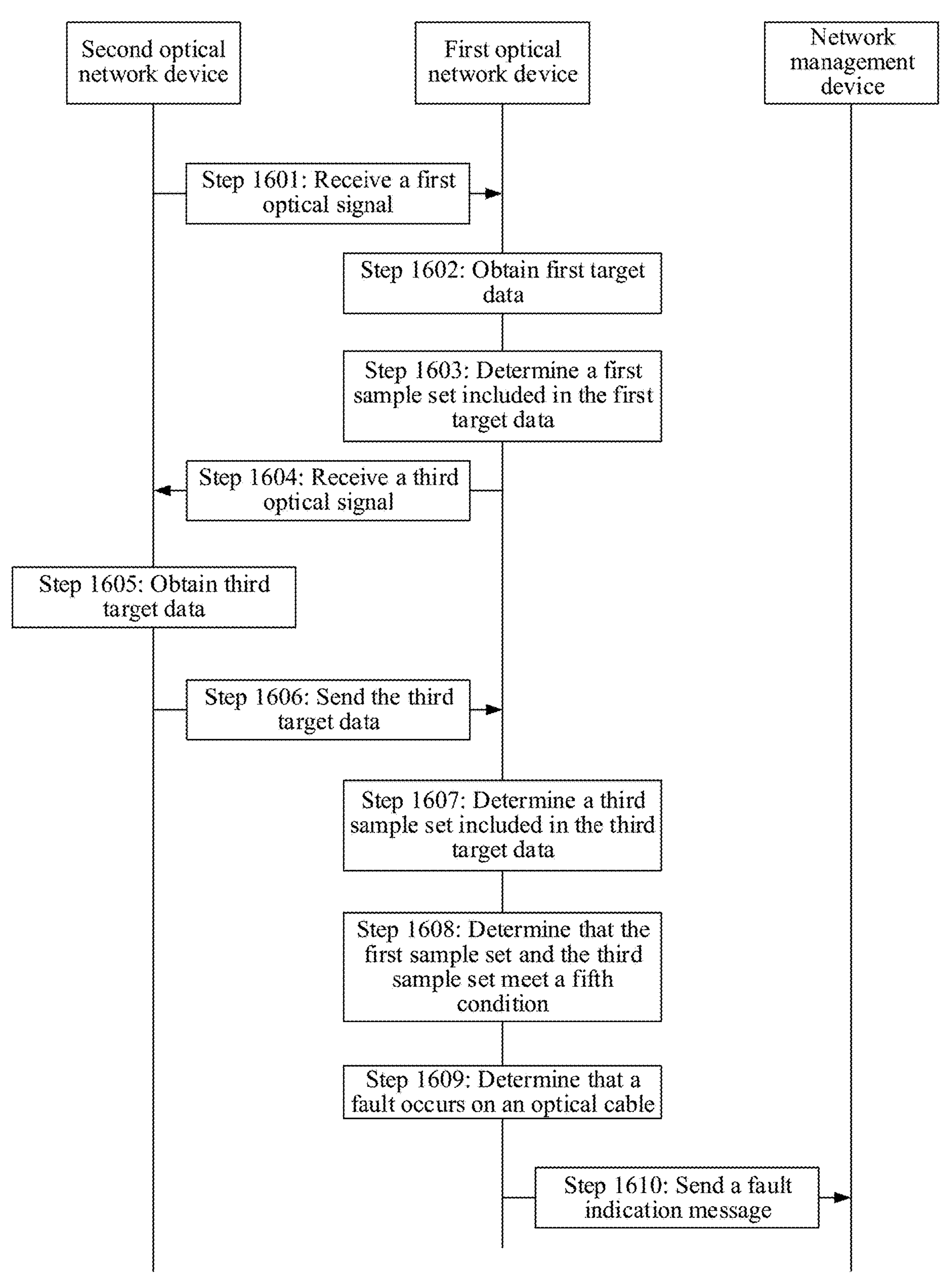
FIG. 16 is a flowchart of steps of a tenth fault locating method for an optical network according to an embodiment of this disclosure.

In Embodiment 9, the network management device locates, based on the first sample set from the first optical network device and the third sample set from the second optical network device, whether a fault occurs on the optical cable. However, in this embodiment, for a specific performing process of locating, by the first optical network device, whether a fault occurs on the optical cable, refer to FIG. 16. FIG. 16 is a flowchart of steps of a tenth fault locating method for an optical network according to an embodiment of this disclosure.

Step 1601: The first optical network device receives a first optical signal from the second optical network device.

Step 1602: The first optical network device sequentially samples the first optical signal for a plurality of times, to obtain first target data.

For description of a performing process of step 1601 and step 1602 in this embodiment, refer to step 1401 and step 1402 in Embodiment 9. Details are not described again.

Step 1603: The first optical network device determines a first sample set included in the first target data.

For description of a process in which the first optical network device determines the first sample set included in the first target data in this embodiment, refer to the description of the process in which the network management device determines the first sample set included in the first target data in step 1404 in Embodiment 9. Details are not described again.

Step 1604: The second optical network device receives a third optical signal from the first optical network device.

Step 1605: The second optical network device sequentially samples the third optical signal, to obtain third target data.

For description of a performing process of step 1604 and step 1605 in this embodiment, refer to the description of the process of step 1405 and step 1406 in Embodiment 9. Details are not described again.

Step 1606: The second optical network device sends the third target data to the first optical network device.

Step 1607: The first optical network device determines a third sample set included in the third target data.

For description of a process in which the first optical network device determines the third sample set included in the third target data in this embodiment, refer to the description of the process in which the network management device determines the third sample set included in the third target data in step 1408 in Embodiment 9. Details are not described again.

Step 1608: The first optical network device determines that the first sample set and the third sample set meet a fifth condition.

For description of a process in which the first optical network device determines that the first sample set and the third sample set meet the fifth condition in this embodiment, refer to the description of determining, by the network management device, that the first sample set and the third sample set meet the fifth condition in step 1409 in Embodiment 9. Details are not described again.

Step 1609: The first optical network device determines that a fault occurs on an optical cable.

Step 1610: The first optical network device sends a fault indication message to the network management device.

In this embodiment, when the first optical network device determines that a fault type in the optical network is a fault on the optical cable, the first optical network device sends the fault indication message to the network management device. The fault indication message indicates that a fault occurs on the optical cable.

According to the method described in this embodiment, the network management device directly determines, based on the fault indication message from the first optical network device, that a fault occurs on the optical cable. This improves accuracy and efficiency of locating a fault on the optical cable, and improves timeliness of locating a fault on the optical cable. In addition, a calculation amount of the network management device is reduced during locating a fault on the optical cable.

EMBODIMENT 11

Figure 17:
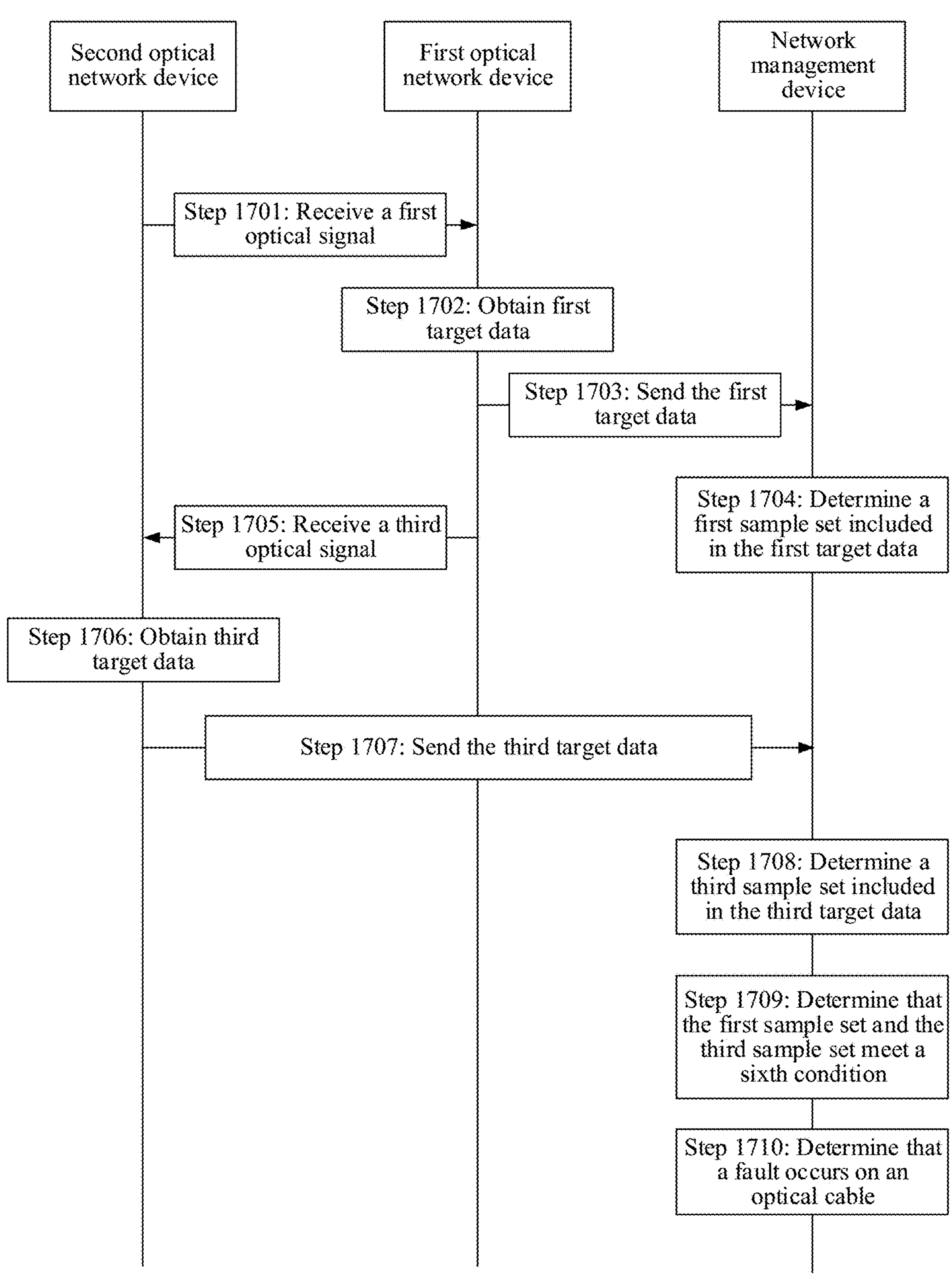
FIG. 17 is a flowchart of steps of an eleventh fault locating method for an optical network according to an embodiment of this disclosure.

A network management device in this embodiment can locate, based on a first optical network device and a second optical network device that transmit optical signals to each other, whether a fault occurs on an optical cable. In addition, a condition for locating a fault on the optical cable by the network management device in this embodiment is different from the condition for locating a fault on the optical cable by the network management device in Embodiment 9. For a specific performing process, refer to FIG. 17. FIG. 17 is a flowchart of steps of an eleventh fault locating method for an optical network according to an embodiment of this disclosure.

Step 1701: The first optical network device receives a first optical signal from the second optical network device.

Step 1702: The first optical network device sequentially samples the first optical signal for a plurality of times, to obtain first target data.

Step 1703: The first optical network device sends the first target data to the network management device.

Step 1704: The network management device determines a first sample set included in the first target data.

Step 1705: The second optical network device receives a third optical signal from the first optical network device.

Step 1706: The second optical network device sequentially samples the third optical signal, to obtain third target data.

Step 1707: The second optical network device sends the third target data to the network management device.

Step 1708: The network management device determines a third sample set included in the third target data.

For description of a performing process of step 1701 to step 1708 in this embodiment, refer to the description of the process of step 1101 to step 1108 in Embodiment 7. Details are not described again.

Step 1709: The network management device determines that the first sample set and the third sample set meet a sixth condition.

The sixth condition is that a change trend of a plurality of optical powers included in the first sample set fluctuates in a first fault locating time period, a plurality of optical powers included in the third sample set show a downward change trend in a third fault locating time period, and both the first fault locating time period and the third fault locating time period are greater than a first time threshold used to determine a fault on a power supply module.

In this embodiment, that a change trend of the first sample set fluctuates means that one or more troughs exist in the first sample set in the first fault locating time period, and an optical power corresponding to each trough is greater than an optical power threshold. It can be learned that, in a transmission process of the first optical signal, because an external force or interference such as engineering construction exists on a first transmission optical path, a change trend of optical powers of the first optical signal transmitted along the first transmission optical path fluctuates. However, because any optical power included in the first sample set is greater than the optical power threshold, it indicates that the first optical signal is normally transmitted along the first transmission optical path.

For specific description that the plurality of optical powers included in the third sample set show a downward change trend in the third fault locating time period, refer to the description that the plurality of optical powers show a downward change trend in the first fault locating time period in step 505 in Embodiment 3. Details are not described again.

For specific description of the first fault locating time period and the third fault locating time period in this embodiment, refer to step 1109 in Embodiment 7. Details are not described again. This embodiment is described by using an example in which the first fault locating time period and the third fault locating time period overlap.

Figure 18:
FIG. 18 is a third example diagram of a correspondence of first target data and a correspondence of third target data according to an embodiment of this disclosure.

For example, FIG. 18 is a third example diagram of a correspondence of the first target data and a correspondence of the third target data according to an embodiment of this disclosure. The network management device determines that the first target data from the first optical network device is first target data 1801 shown in FIG. 18. The network management device further determines that the third target data from the second optical network device is third target data 1802 shown in FIG. 18. That the first sample set and the third sample set meet the sixth condition specifically means that a change trend of the first sample set included in the first target data 1801 fluctuates in the first fault locating time period. In addition, an optical power corresponding to any trough of the first sample set in the first fault locating time period is greater than the optical power threshold (for example, 60 dBm). The third sample set included in the third target data 1802 shows a downward change trend in the third fault locating time period, and the first fault locating time period is greater than the first time threshold used to determine a fault on the power supply module. The first fault locating time period and the third fault locating time period overlap, and both are a time period 1800 shown in FIG. 18. It can be learned from FIG. 18 that a time period in which a waveform of the third sample set shows a downward trend coincides with a time period in which a waveform of the first sample set fluctuates due to external force or interference.

Step 1710: The network management device determines that a fault occurs on an optical cable.

In a process of transmitting the first optical signal along a first transmission optical path and a process of transmitting the third optical signal along the second transmission optical path in this embodiment, the sixth condition is met. It indicates that a time period in which a fault occurs on the second transmission optical path coincides with a time period in which an external force action or an interference action occurs on the first transmission optical path. That is, the first fault locating time period coincides with the third fault locating time period. Therefore, it indicates that in the third fault locating time period in which a fault occurs on the second transmission optical path, the optical power of the transmitted first optical signal fluctuates due to external force or interference on the first transmission optical path. In this case, a fault occurs on a fiber core that is included in the optical cable and that is used to transmit the third optical signal, but optical powers of the first optical signal transmitted on a fiber core that is used to transmit the first optical signal fluctuate in the first fault locating time period due to an external force or interference. It can be learned that, in this example, the network management device determines that a fault occurs on the optical cable, and can determine that a fault occurs on the fiber core that is in the optical cable and that is used to transmit the third optical signal.

According to the method described in this embodiment, the network management device directly locates a fault on the optical cable based on the first target data from the first optical network device and the third target data from the second optical network device. This improves accuracy and efficiency of locating a fault on the optical cable, and improves timeliness of locating a fault on the optical cable. In the process of locating a fault on the optical cable in this embodiment, a hardware device dedicated to locating a fault on the optical cable does not need to be added in the optical network, to reduce network complexity and costs of locating a fault in the optical network.

EMBODIMENT 12

Figure 19:
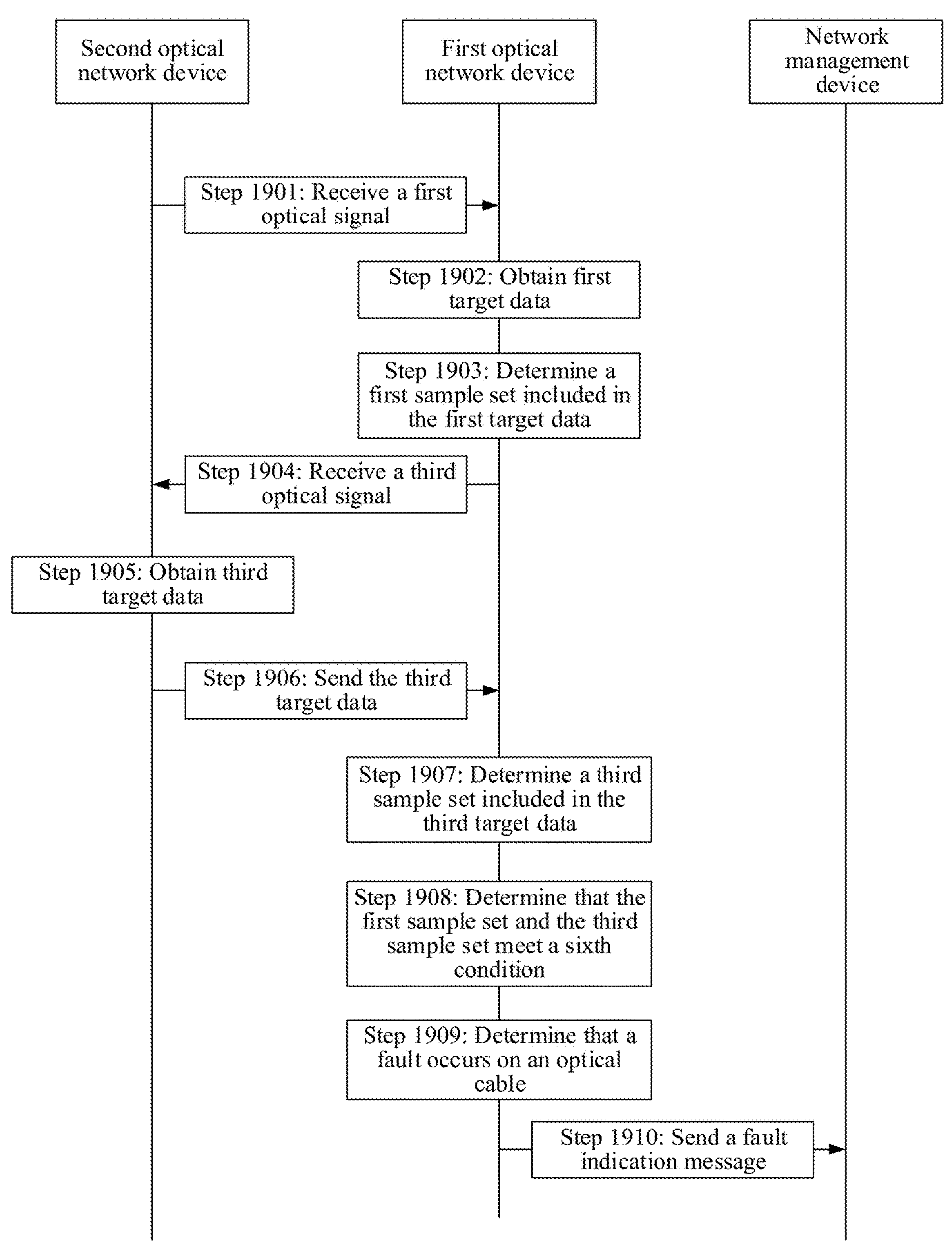
FIG. 19 is a flowchart of steps of a twelfth fault locating method for an optical network according to an embodiment of this disclosure.

In Embodiment 11, the network management device locates, based on the first sample set from the first optical network device and the third sample set from the second optical network device, whether a fault occurs on the optical cable. In this embodiment, the first optical network device determines whether a fault occurs on the optical cable. For a specific performing process, refer to FIG. 19. FIG. 19 is a flowchart of steps of an eleventh fault locating method for an optical network according to an embodiment of this disclosure.

Step 1901: The first optical network device receives a first optical signal from the second optical network device.

Step 1902: The first optical network device sequentially samples the first optical signal for a plurality of times, to obtain first target data.

For description of a performing process of step 1901 and step 1902 in this embodiment, refer to step 1701 and step 1702 in Embodiment 11. Details are not described again.

Step 1903: The first optical network device determines a first sample set included in the first target data.

For description of a process in which the first optical network device determines the first sample set included in the first target data in this embodiment, refer to the description of the process in which the network management device determines the first sample set included in the first target data in step 1704 in Embodiment 11. Details are not described again.

Step 1904: The second optical network device receives a third optical signal from the first optical network device.

Step 1905: The second optical network device sequentially samples the third optical signal, to obtain third target data.

For description of a performing process of step 1904 and step 1905 in this embodiment, refer to the description of the process of step 1705 and step 1706 in Embodiment 11. Details are not described again.

Step 1906: The second optical network device sends the third target data to the first optical network device.

Step 1907: The first optical network device determines a third sample set included in the third target data.

For description of a process in which the first optical network device determines the third sample set included in the third target data in this embodiment, refer to the description of the process in which the network management device determines the third sample set included in the third target data in step 1708 in Embodiment 11. Details are not described again.

Step 1908: The first optical network device determines that the first sample set and the third sample set meet a sixth condition.

For description of a process in which the first optical network device determines that the first sample set and the third sample set meet the sixth condition in this embodiment, refer to the description of determining, by the network management device, that the first sample set and the third sample set meet the sixth condition in step 1709 in Embodiment 11. Details are not described again.

Step 1909: The first optical network device determines that a fault occurs on an optical cable.

Step 1910: The first optical network device sends a fault indication message to the network management device.

In this embodiment, when the first optical network device determines that a fault type in the optical network is a fault on the optical cable, the first optical network device sends the fault indication message to the network management device. The fault indication message indicates that a fault occurs on the optical cable.

According to the method described in this embodiment, the network management device directly determines, based on the fault indication message from the first optical network device, that a fault occurs on the optical cable. This improves accuracy and efficiency of locating a fault on the optical cable, and improves timeliness of locating a fault on the optical cable. In addition, a calculation amount of the network management device is reduced during locating a fault on the optical cable.

EMBODIMENT 13

Figure 20:
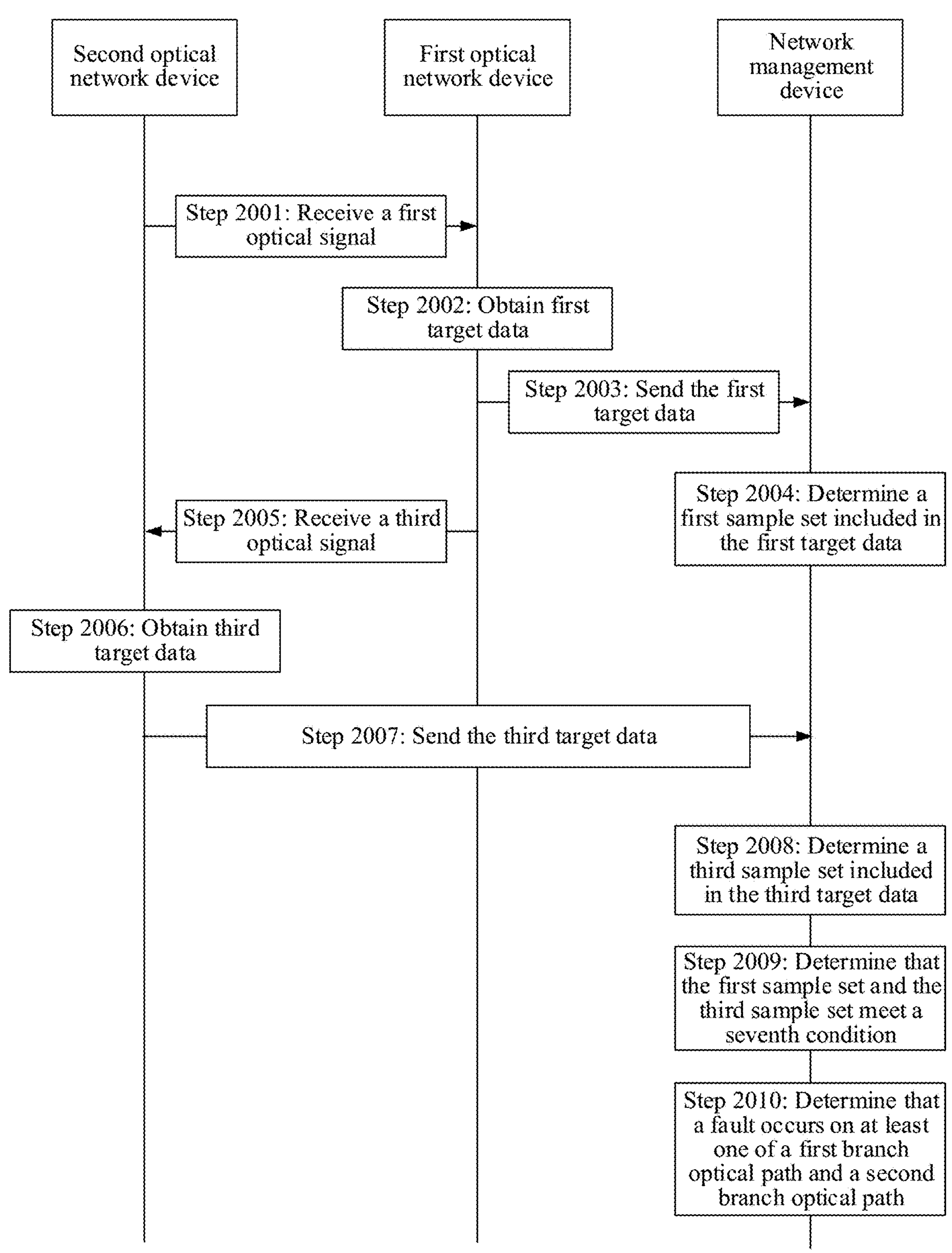
FIG. 20 is a flowchart of steps of a thirteenth fault locating method for an optical network according to an embodiment of this disclosure.

An optical network management device in this embodiment can locate, based on a first sample set from a first optical network device and a third sample set from a second optical network device, whether a fault occurs on a branch optical path. For a specific performing process, refer to FIG. 20. FIG. 20 is a flowchart of steps of a thirteenth fault locating method for an optical network according to an embodiment of this disclosure.

Step 2001: The first optical network device receives a first optical signal from the second optical network device.

Step 2002: The first optical network device sequentially samples the first optical signal for a plurality of times, to obtain first target data.

Step 2003: The first optical network device sends the first target data to the network management device.

Step 2004: The network management device determines a first sample set included in the first target data.

Step 2005: The second optical network device receives a third optical signal from the first optical network device.

Step 2006: The second optical network device sequentially samples the third optical signal, to obtain third target data.

Step 2007: The second optical network device sends the third target data to the network management device.

Step 2008: The network management device determines a third sample set included in the third target data.

For description of a performing process of step 2001 to step 2008 in this embodiment, refer to the description of the process of step 1101 to step 1108 in Embodiment 7. Details are not described again.

Step 2009: The network management device determines that the first sample set and the third sample set meet a seventh condition.

The seventh condition is that a plurality of optical powers included in the first sample set show a downward change trend in a first fault locating time period. The first fault locating time period is greater than a first time threshold used to determine that a fault occurs on the power supply module. A difference between any two of a plurality of optical powers included in the third sample set in a third fault locating time period is less than or equal to a preset threshold.

In this embodiment, that a difference between any two of the plurality of optical powers included in the third sample set in the third fault locating time period is less than or equal to the preset threshold means that a waveform of the third sample set in the third fault locating time period tends to be flat. As a result, a difference between any two optical powers is less than or equal to the preset threshold. A value of the preset threshold is not limited in this embodiment, provided that a change trend of the waveform corresponding to the third sample set is flat. Any optical power in the third sample set in this embodiment in the third fault locating time period is greater than the optical power threshold. Therefore, it can be learned that the third optical signal is normally transmitted along the second transmission optical path. It can be learned that a fault does not occur on the second transmission optical path.

For specific description that the plurality of optical powers included in the first sample set show a downward change trend in the first fault locating time period, refer to the description that the plurality of optical powers show a downward change trend in the first fault locating time period in step 505 in Embodiment 3. Details are not described again.

For specific description of the first fault locating time period and the third fault locating time period in this embodiment, refer to step 1109 in Embodiment 7. Details are not described again. This embodiment is described by using an example in which the first fault locating time period and the third fault locating time period overlap.

Figure 21:
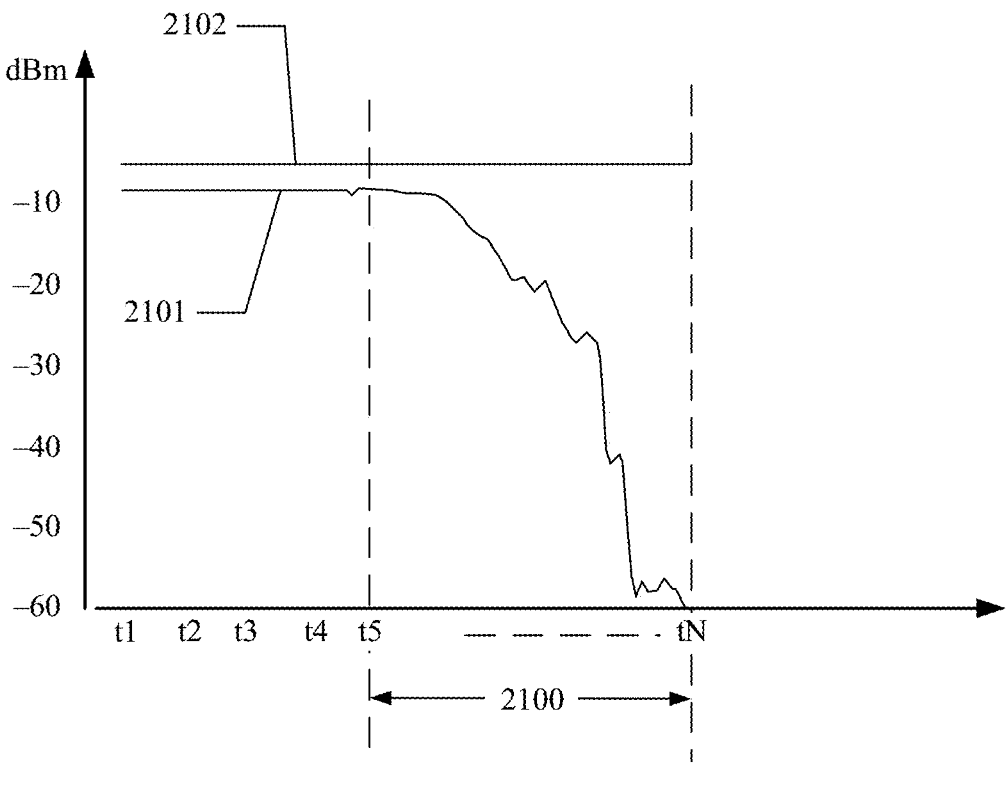
FIG. 21 is a fourth example diagram of a correspondence of first target data and a correspondence of third target data according to an embodiment of this disclosure.

For example, FIG. 21 is a fourth example diagram of a correspondence of the first target data and a correspondence of the third target data according to an embodiment of this disclosure. The network management device determines that the first target data from the first optical network device is first target data 2101 shown in FIG. 21. The network management device further determines that the third target data from the second optical network device is third target data 2102 shown in FIG. 21. In this case, that the first sample set and the third sample set meet the seventh condition specifically means that the first sample set included in the first target data 2101 shows a downward change trend in the first fault locating time period, and decreases to the optical power threshold (for example, 60 dBm). The third sample set included in the third target data 2102 in the third fault locating time period shows a gentle change trend. That is, in the third fault locating time period, a difference between any two optical powers included in the third sample set of the third target data 2102 is less than or equal to a preset threshold. In FIG. 21, an example in which any two optical powers in the third sample set included in the third target data 2102 are equal is used. In this example, the first fault locating time period and the third fault locating time period overlap, and both are a time period 2100 shown in FIG. 21. The time period 2100 is greater than the first time threshold used to determine a fault on the power supply module. It can be learned that the third sample set shows a straight line trend in the third fault locating time period shown in FIG. 21. It can be learned from FIG. 21 that a time period in which a waveform of the third sample set shows a flat trend coincides with a time period in which a waveform of the first sample set shows a downward trend.

Step 2010: The network management device determines that a fault occurs on at least one of a first branch optical path and a second branch optical path.

In a process of transmitting the first optical signal along a first transmission optical path and a process of transmitting the third optical signal along the second transmission optical path in this embodiment, the seventh condition is met. Because the waveform of the third sample set corresponding to the third optical signal tends to be flat, it indicates that the third optical signal is normally transmitted along the second transmission optical path. However, if the plurality of optical powers included in the first sample set corresponding to the first optical signal transmitted along the first transmission optical path show a downward change trend in the first fault locating time period and decrease to the optical power threshold, it indicates that a fault occurs on the first transmission optical path.

Both the first transmission optical path and the second transmission optical path include an optical cable, and the second transmission optical path is in a normal state. It indicates that the optical cable is also in a normal state. In this case, it indicates that a fault occurs on the branch optical path included in the first transmission optical path. With reference to FIG. 1, the branch optical path included in the first transmission optical path specifically includes the first branch optical path and the second branch optical path. For specific description of the first branch optical path and the second branch optical path, refer to the corresponding description in FIG. 1. Details are not described again.

It can be learned that, when the network management device in this embodiment determines that the first sample set and the third sample set meet the seventh condition, the network management device can determine that a fault occurs on at least one of the first branch optical path and the second branch optical path. It can be learned that the network management device can specifically determine that a fault occurs on at least one of the fiber patch cord 151, the ODF 152, the fiber pigtail 153, the fiber pigtail 143, the ODF 141, and the fiber patch cord 142 shown in FIG. 1.

According to the method in this embodiment, the network management device directly determines, based on the first target data from the first optical network device and the third target data from the second optical network device, that a fault occurs on a branch optical path used to transmit the first optical signal. This improves accuracy and efficiency of locating a fault on the branch optical path, and improves timeliness of locating a fault on the branch optical path. In a process of locating a fault on the branch optical path in this embodiment, a hardware device dedicated to locating a fault on the optical cable does not need to be added in the optical network, to reduce network complexity and costs of locating a fault in the optical network.

EMBODIMENT 14

Figure 22:
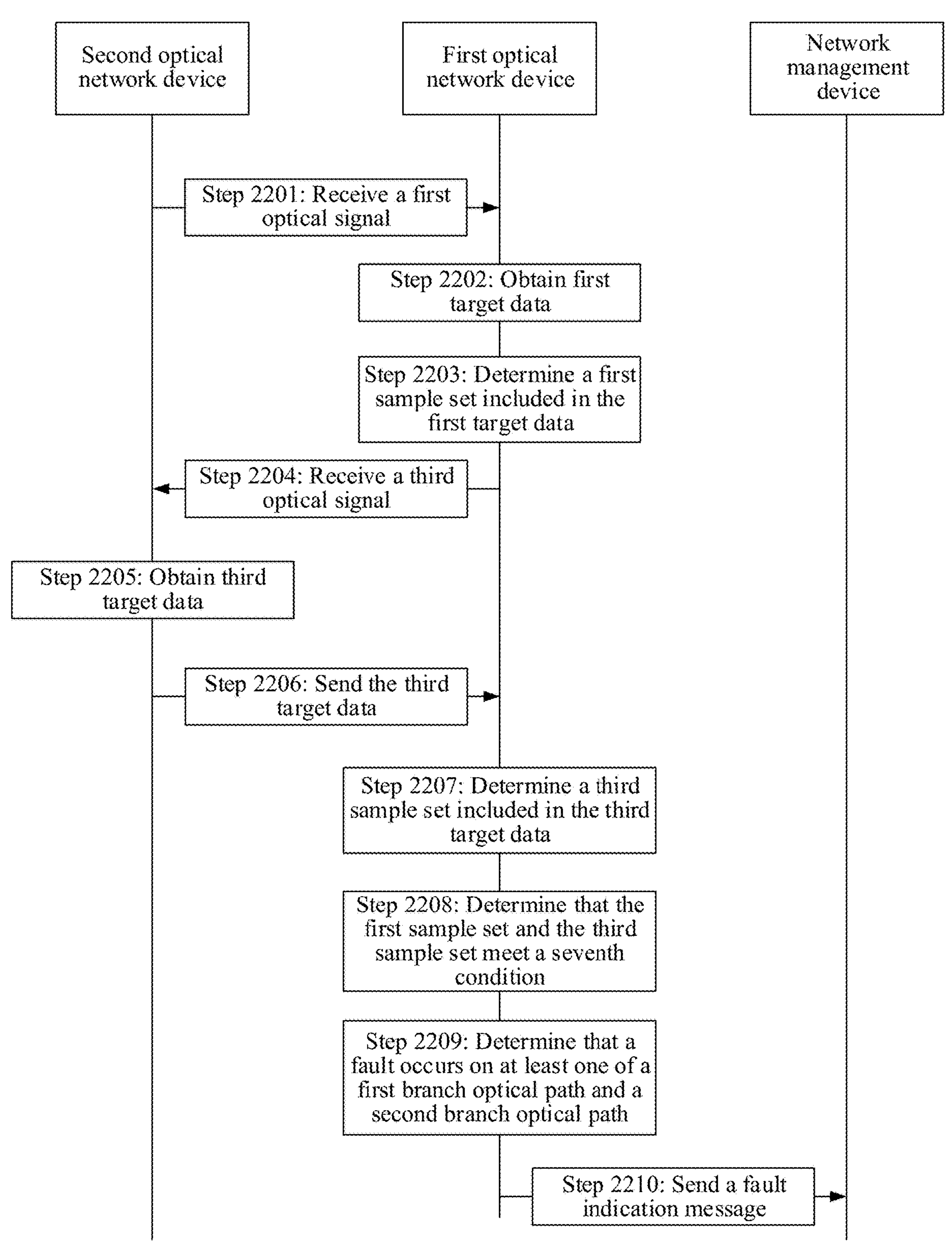
FIG. 22 is a flowchart of steps of a fourteenth fault locating method for an optical network according to an embodiment of this disclosure.

The optical network management device in Embodiment 13 can locate, based on the first sample set from the first optical network device and the third sample set from the second optical network device, whether a fault occurs on the branch optical path. The first optical network device in this embodiment can locate whether a fault occurs on the branch optical path. For a specific performing process, refer to FIG. 22. FIG. 22 is a flowchart of steps of a fourteenth fault locating method for an optical network according to an embodiment of this disclosure.

Step 2201: The first optical network device receives a first optical signal from the second optical network device.

Step 2202: The first optical network device sequentially samples the first optical signal for a plurality of times, to obtain first target data.

For a performing process of step 2201 and step 2202 in this embodiment, refer to the description of step 2001 and step 2002 in Embodiment 13. Details are not described again.

Step 2203: The first optical network device determines a first sample set included in the first target data.

For specific description that the first optical network device determines the first sample set included in the first target data in this embodiment, refer to the process in which the network management device determines the first sample set included in the first target data in step 2004 in Embodiment 13. Details are not described again.

Step 2204: The second optical network device receives a third optical signal from the first optical network device.

Step 2205: The second optical network device sequentially samples the third optical signal, to obtain third target data.

For description of a performing process of step 2204 and step 2205 in this embodiment, refer to the description of step 2005 and step 2006 in Embodiment 13. Details are not described again.

Step 2206: The second optical network device sends the third target data to the first optical network device.

Step 2207: The first optical network device determines a third sample set included in the third target data.

For description of a process in which the second optical network device determines the third sample set included in the third target data in this embodiment, refer to the description that the network management device determines the third sample set included in the third target data in step 2008 in Embodiment 13. Details are not described again.

It should be noted that this embodiment is described by using an example in which the second optical network device sends the third target data to the first optical network device. In another example, the second optical network device may also directly send the third sample set to the first optical network device.

Step 2208: The first optical network device determines that the first sample set and the third sample set meet a seventh condition.

For description of a specific process in which the first optical network device determines that the first sample set and the third sample set meet the seventh condition in this embodiment, refer to the description of the process in which the network management device determines that the first sample set and the third sample set meet the seventh condition in step 2009 in Embodiment 13. Details are not described again.

Step 2209: The first optical network device determines that a fault occurs on at least one of a first branch optical path and a second branch optical path.

For a specific process in which the first optical network device determines that a fault occurs on at least one of the first branch optical path and the second branch optical path is described in this embodiment, refer to the description of determining, by the network management device, that a fault occurs on at least one of the first branch optical path and the second branch optical path in step 2010 in Embodiment 13. Details are not described again.

Step 2210: The first optical network device sends a fault indication message to the network management device.

In this embodiment, when the first optical network device determines that a fault type in the optical network is a fault on at least one of the first branch optical path and the second branch optical path, the first optical network device sends the fault indication message to the network management device. The fault indication message indicates that a fault occurs on at least one of the first branch optical path and the second branch optical path.

According to the method described in this embodiment, the network management device directly determines, based on the fault indication message from the first optical network device, that a fault occurs on the optical cable. This improves accuracy and efficiency of locating a fault on the optical cable, and improves timeliness of locating a fault on the optical cable. In addition, a calculation amount of the network management device is reduced during locating a fault on the optical cable.

EMBODIMENT 15

Figure 23:
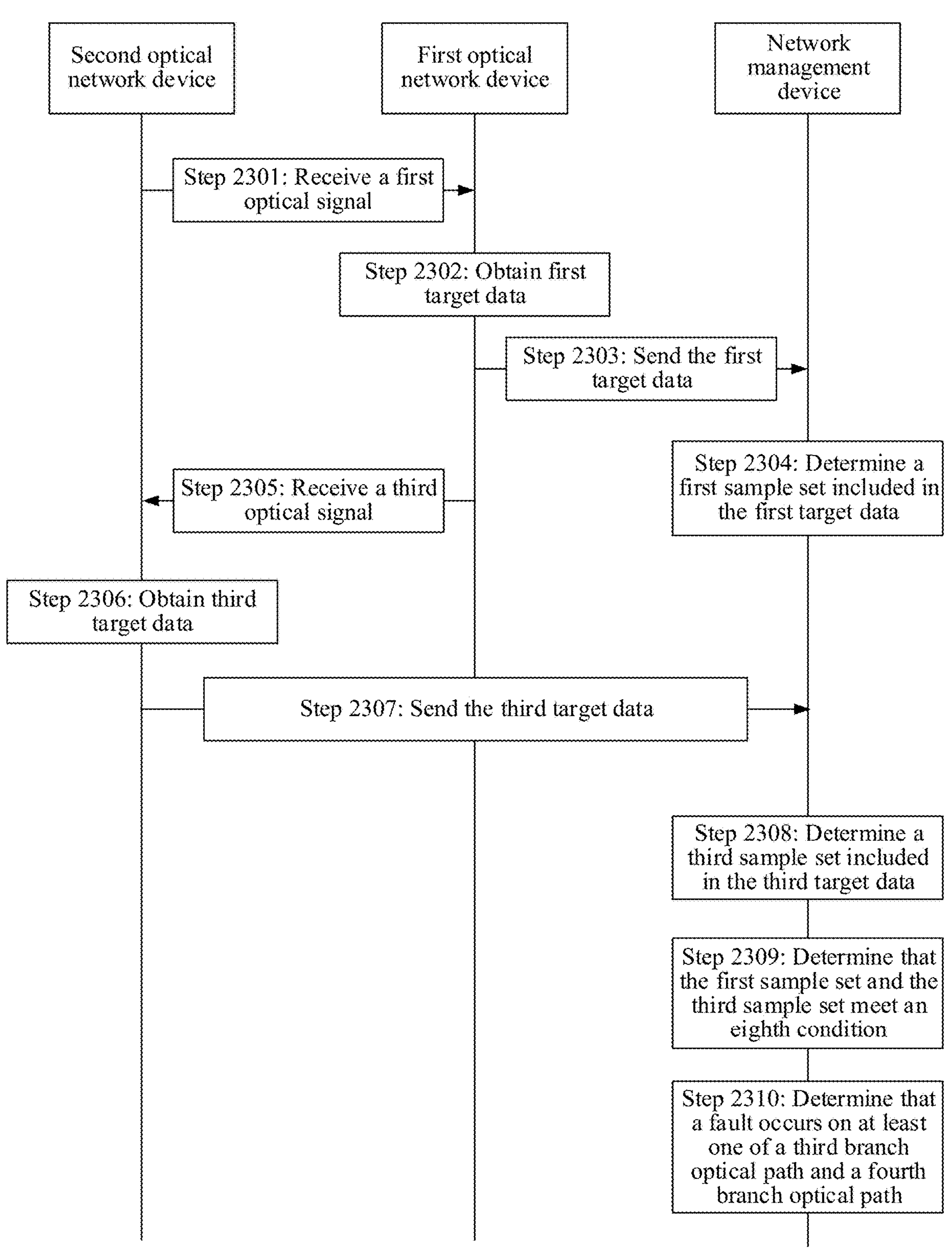
FIG. 23 is a flowchart of steps of a fifteenth fault locating method for an optical network according to an embodiment of this disclosure.

An optical network management device in this embodiment can locate, based on a first sample set from a first optical network device and a third sample set from a second optical network device, whether a fault occurs on a branch optical path. For a specific performing process, refer to FIG. 23. FIG. 23 is a flowchart of steps of a fifteenth fault locating method for an optical network according to an embodiment of this disclosure.

Step 2301: The first optical network device receives a first optical signal from the second optical network device.

Step 2302: The first optical network device sequentially samples the first optical signal for a plurality of times, to obtain first target data.

Step 2303: The first optical network device sends the first target data to the network management device.

Step 2304: The network management device determines a first sample set included in the first target data.

Step 2305: The second optical network device receives a third optical signal from the first optical network device.

Step 2306: The second optical network device sequentially samples the third optical signal, to obtain third target data.

Step 2307: The second optical network device sends the third target data to the network management device.

Step 2308: The network management device determines a third sample set included in the third target data.

For description of a performing process of step 2301 to step 2308 in this embodiment, refer to the description of the process of step 1101 to step 1108 in Embodiment 7. Details are not described again.

Step 2309: The network management device determines that the first sample set and the third sample set meet an eighth condition.

The eighth condition is that a difference between any two of a plurality of optical powers included in the first sample set is less than or equal to a preset threshold, a plurality of optical powers included in the third sample set show a downward change trend in a third fault locating time period, and the third fault locating time period is greater than a first time threshold used to determine a fault on a power supply module.

In this embodiment, that a difference between any two of the plurality of optical powers included in the first sample set is less than or equal to a preset threshold in a first fault locating time period means that a waveform of the first sample set in the first fault locating time tends to be flat. As a result, a difference between any two optical powers is less than or equal to the preset threshold. For specific description of the preset threshold, refer to Embodiment 13. Details are not described again.

It can be learned that the waveform corresponding to the first sample set shows a flat change trend. Therefore, it can be learned that the first optical signal is normally transmitted along a first transmission optical path. That is, a fault does not occur on the first transmission optical path.

For specific description that the plurality of optical powers included in the third sample set show a downward change trend in the third fault locating time period, refer to the description that the plurality of optical powers show a downward change trend in the first fault locating time period in step 505 in Embodiment 3. Details are not described again. For specific description of the first fault locating time period and the third fault locating time period in this embodiment, refer to Embodiment 13. Details are not described again.

Step 2310: The network management device determines that a fault occurs on at least one of a third branch optical path and a fourth branch optical path.

In a process of transmitting the first optical signal along the first transmission optical path and a process of transmitting the third optical signal along a second transmission optical path in this embodiment, the eighth condition is met. Because a waveform of the first sample set corresponding to the first optical signal tends to be flat, it indicates that the first optical signal is normally transmitted along the first transmission optical path. However, if the plurality of optical powers included in the third sample set corresponding to the third optical signal transmitted along the second transmission optical path show a downward change trend in the third fault locating time period and decrease to the optical power threshold, it indicates that a fault occurs on the second transmission optical path.

Both the first transmission optical path and the second transmission optical path include an optical cable, and the first transmission optical path is in a normal state. It indicates that the optical cable is in a normal state. In this case, it indicates that a fault occurs on a branch optical path included in the second transmission optical path. With reference to FIG. 1, the branch optical path included in the second transmission optical path specifically includes the third branch optical path and the fourth branch optical path. For specific description of the third branch optical path and the fourth branch optical path, refer to the corresponding description in FIG. 1. Details are not described again.

It can be learned that, when the network management device in this embodiment determines that the first sample set and the third sample set meet the eighth condition, the network management device can determine that a fault occurs on at least one of the third branch optical path and the fourth branch optical path. It can be learned that the network management device can specifically determine that a fault occurs on at least one of the fiber patch cord 144, the ODF 141, the fiber pigtail 145, the fiber pigtail 154, the ODF 152, and the fiber patch cord 155 shown in FIG. 1.

According to the method in this embodiment, the network management device directly determines, based on the first target data from the first optical network device and the third target data from the second optical network device, that a fault occurs on a branch optical path used to transmit the second optical signal. This improves accuracy and efficiency of locating a fault on the branch optical path, and improves timeliness of locating a fault on the branch optical path. In a process of locating a fault on the branch optical path in this embodiment, a hardware device dedicated to locating a fault on the optical cable does not need to be added in the optical network, to reduce network complexity and costs of locating a fault in the optical network.

EMBODIMENT 16

Figure 24:
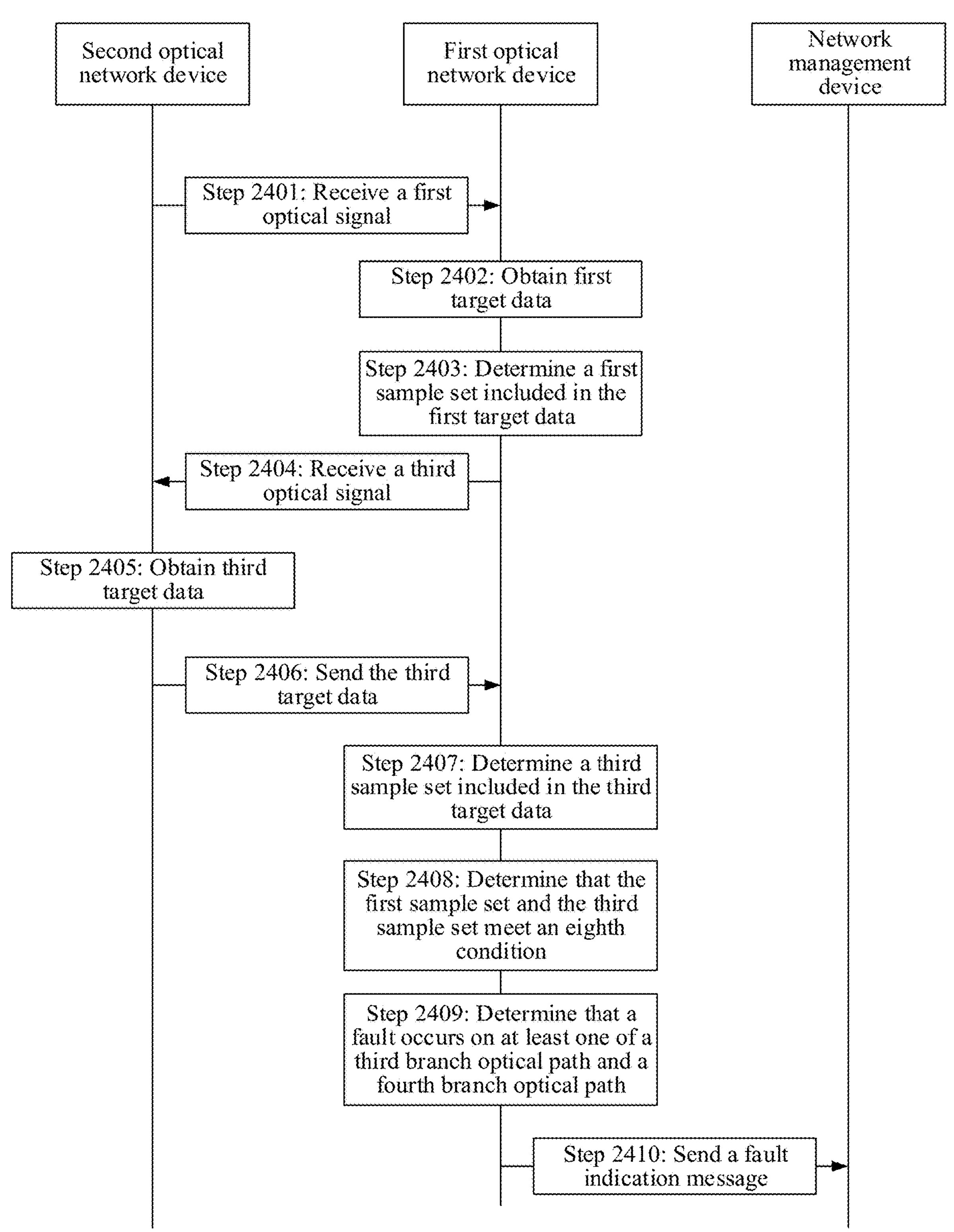
FIG. 24 is a flowchart of steps of a sixteenth fault locating method for an optical network according to an embodiment of this disclosure.

In Embodiment 15, the network management device locates, based on the first sample set from the first optical network device and the third sample set from the second optical network device, whether a fault occurs on the branch optical path. The first optical network device in this embodiment can locate whether a fault occurs on the branch optical path. For a specific performing process, refer to FIG. 24. FIG. 24 is a flowchart of steps of a sixteenth fault locating method for an optical network according to an embodiment of this disclosure.

Step 2401: The first optical network device receives a first optical signal from the second optical network device.

Step 2402: The first optical network device sequentially samples the first optical signal for a plurality of times, to obtain first target data.

For description of a performing process of step 2401 and step 2402 in this embodiment, refer to the description of the process of step 2301 and step 2302 in Embodiment 15. Details are not described again.

Step 2403: The first optical network device determines a first sample set included in the first target data.

For description of a process in which the first optical network device determines the first sample set included in the first target data in this embodiment, refer to the process in which the network management device determines the first sample set included in the first target data in step 2304 in Embodiment 15. Details are not described again.

Step 2404: The second optical network device receives a third optical signal from the first optical network device.

Step 2405: The second optical network device sequentially samples the third optical signal, to obtain third target data.

For description of a performing process of step 2404 and step 2405 in this embodiment, refer to the description of the process of step 2305 and step 2306 in Embodiment 15. Details are not described again.

Step 2406: The second optical network device sends the third target data to the first optical network device.

Step 2407: The first optical network device determines a third sample set included in the third target data.

For description of a process in which the first optical network device determines the third sample set included in the third target data in this embodiment, refer to the description of the process in which the network management device determines the third sample set included in the third target data in step 2308 in Embodiment 15. Details are not described again.

Step 2408: The first optical network device determines that the first sample set and the third sample set meet an eighth condition.

For description of a process in which the first optical network device determines that the first sample set and the third sample set meet the eighth condition in this embodiment, refer to the process in which the network management device determines that the first sample set and the third sample set meet the eighth condition in step 2309 in Embodiment 15. Details are not described again.

Step 2409: The first optical network device determines that a fault occurs on at least one of a third branch optical path and a fourth branch optical path.

For description of a specific process of step 2409 in this embodiment, refer to the description of the process in which the network management device determines that a fault occurs on at least one of the third branch optical path and the fourth branch optical path in step 2310 in Embodiment 15. Details are not described again.

Step 2410: The first optical network device sends a fault indication message to the network management device.

When the first optical network device in this embodiment determines that a fault occurs on at least one of the third branch optical path and the fourth branch optical path, the first optical network device sends the fault indication message to the network management device. The fault indication message indicates that a fault occurs on at least one of the third branch optical path and the fourth branch optical path.

According to the method described in this embodiment, the network management device directly determines, based on the fault indication message from the first optical network device, that a fault occurs on the optical cable. This improves accuracy and efficiency of locating a fault on the optical cable, and improves timeliness of locating a fault on the optical cable. In addition, a calculation amount of the network management device is reduced during locating a fault on the optical cable.

Figure 25:
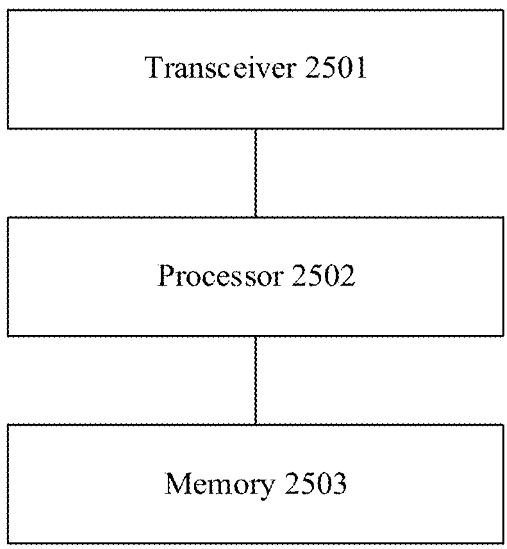
FIG. 25 is an example diagram of a structure of an embodiment of an electronic device according to an embodiment of this disclosure.

An embodiment of this disclosure further provides an electronic device. For a structure of the electronic device, refer to FIG. 25. FIG. 25 is an example diagram of a structure of an embodiment of an electronic device according to an embodiment of this disclosure. The electronic device includes a processor 2502, a memory 2503, and a transceiver 2501. The processor 2502 is connected to each of the memory 2503 and the transceiver 2501 through a line.

The memory 2503 is configured to store a computer program. The processor 2502 reads and executes the computer program stored in the memory, to perform corresponding processing. Some or all functions of the processor 2502 may be implemented by hardware. In this case, the processor 2502 may be one or more chips, or one or more integrated circuits. For example, the processor 2502 may be one or more field-programmable gate arrays (FPGA), application specific integrated circuits (ASIC), system on chips (SoC), central processing units (CPU), network processors (NP), digital signal processors (DSP), micro controller units (MCU), programmable logic devices (PLD), or another integrated chips, or any combination of the chips or processors.

If the electronic device in this embodiment is a network management device, the processor 2502 in this embodiment is configured to perform a step that is related to processing and that is performed by the network management device in any one of Embodiment 1 to Embodiment 16. The transceiver 2501 is configured to perform a step that is related to sending and receiving and that is performed by the network management device in any one of Embodiment 1 to Embodiment 16.

If the electronic device in this embodiment is a first optical network device, the processor 2502 in this embodiment is configured to perform a step that is related to processing and that is performed by the first optical network device in any one of Embodiment 1 to Embodiment 16. The transceiver 2501 is configured to perform a step that is related to sending and receiving and that is performed by the first optical network device in any one of Embodiment 1 to Embodiment 16.

If the electronic device in this embodiment is a third optical network device, the processor 2502 in this embodiment is configured to perform a step that is related to processing and that is performed by the third optical network device in Embodiment 5 or Embodiment 6. The transceiver 2501 is configured to perform a step that is related to receiving and sending and that is performed by the third optical network device in Embodiment 5 or Embodiment 6.

If the electronic device in this embodiment is a fourth optical network device, the processor 2502 in this embodiment is configured to perform a step that is related to processing and that is performed by the fourth optical network device in Embodiment 5 or Embodiment 6. The transceiver 2501 is configured to perform a step that is related to receiving and sending and that is performed by the fourth optical network device in Embodiment 5 or Embodiment 6.

An embodiment of this disclosure further provides an optical network. For a structure of the optical network in this embodiment, refer to FIG. 1 or FIG. 8.

The foregoing embodiments are merely intended to describe the technical solutions of the present invention, but not to limit the technical solutions. Although the present invention has been described in detail with reference to the foregoing embodiments, persons of ordinary skill in the art should understand that they may still make modification to the technical solutions described in the foregoing embodiments or make equivalent replacements to some technical features thereof, without departing from the spirit and scope of the technical solutions of disclosed embodiments.

What is claimed is:

1. A fault locating method for an optical network, the method comprising:

obtaining, by a network management device, a first sample set from a first optical network device, wherein the first sample set comprises a plurality of optical powers obtained by the first optical network device sequentially sampling a first optical signal for a plurality of times in a first fault locating time period, wherein at least one optical power included in the first sample set is less than or equal to an optical power threshold;

obtaining, by the network management device, a third sample set from a second optical network device, wherein the third sample set comprises a plurality of optical powers obtained by sequentially sampling a third optical signal from the first optical network device for a plurality of times by the second optical network device in a third fault locating time period, wherein the first fault locating time period and the third fault locating time period at least partially overlap, or a time interval between the first fault locating time period and the third fault locating time period is less than or equal to a second time threshold; and determining, by the network management device, a fault type in an optical network based on a change trend of the plurality of optical powers, wherein the fault type in the optical network is a fault on an optical cable connected between the first optical network device and the second optical network device or a fault on at least one of a first branch optical path and a second branch optical path.

2. The method according to claim 1, wherein the determining, by the network management device, a fault type in an optical network comprises:

determining, by the network management device, that the first sample set meets a first condition providing that the plurality of optical powers decrease sequentially in the first fault locating time period, the first fault locating time period being less than or equal to a first time threshold; and determining, by the network management device, that the fault type in the optical network is a fault on a power supply module.

3. The method according to claim 1, wherein the determining, by the network management device, a fault type in an optical network comprises:

determining, by the network management device, that the first sample set meets a second condition providing that the plurality of optical powers exhibit a downward change trend in the first fault locating time period, the first fault locating time period being greater than a first time threshold used to determine a fault on a power supply module; and determining, by the network management device, that the fault type in the optical network is a fault on a transmission optical path configured to transmit the first optical signal sent by a second optical network device to the first optical network device.

4. The method according to claim 3, further comprising:

obtaining, by the network management device, a second sample set including a plurality of optical powers obtained by sequentially sampling a second optical signal for a plurality of times in a second fault locating time period, wherein at least one optical power included in the second sample set is less than or equal to the optical power threshold, the second optical signal being an optical signal transmitted between a third optical network device and a fourth optical network device;

determining, by the network management device, that the second sample set meets a third condition providing that the plurality of optical powers included in the second sample set exhibit a downward change trend in the second fault locating time period, the second fault locating time period being greater than the first time threshold used to determine a fault on the power supply module; and the determining, by the network management device, that the fault type in the optical network is a fault on a transmission optical path comprises:

determining, by the network management device, that a fault has occurred on an optical cable configured to transmit the first optical signal and the second optical signal.

5. The method according to claim 1, wherein the second optical network device is configured to send the first optical signal to the first optical network device.

6. The method according to claim 5, wherein the first fault locating time period and the third fault locating time period at least partially overlap.

7. The method according to claim 5, wherein the determining, by the network management device that the fault type in the optical network is a fault on a transmission optical path comprises:

determining, by the network management device, that the first sample set and the third sample set meet a fourth condition providing that the plurality of optical powers included in the first sample set exhibit a downward change trend in the first fault locating time period, the plurality of optical powers included in the third sample set exhibit a downward change trend in the third fault locating time period, and both the first fault locating time period and the third fault locating time period are greater than a first time threshold; and determining, by the network management device, that a fault has occurred on an optical cable connected between the first optical network device and the second optical network device.

8. The method according to claim 5, wherein the determining, by the network management device that the fault type in the optical network is a fault on a transmission optical path comprises:

determining, by the network management device, that the first sample set and the third sample set meet a fifth condition providing that the plurality of optical powers included in the first sample set exhibit a downward change trend in the first fault locating time period, a change trend of the plurality of optical powers included in the third sample set fluctuates in the third fault locating time period, and both the first fault locating time period and the third fault locating time period are greater than a first time threshold; and determining, by the network management device, that a fault has occurred on an optical cable connected between the first optical network device and the second optical network device.

9. The method according to claim 5, wherein the determining, by the network management device that the fault type in the optical network is a fault on a transmission optical path comprises:

determining, by the network management device, that the first sample set and the third sample set meet a sixth condition providing that a change trend of the plurality of optical powers included in the first sample set fluctuates in the first fault locating time period, the plurality of optical powers included in the third sample set exhibit a downward change trend in the third fault locating time period, and both the first fault locating time period and the third fault locating time period are greater than a first time threshold; and determining, by the network management device, that a fault has occurred on an optical cable connected between the first optical network device and the second optical network device.

10. The method according to claim 5, wherein the determining, by the network management device that the fault type in the optical network is a fault on a transmission optical path comprises:

determining, by the network management device, that the first sample set and the third sample set meet a seventh condition providing that the plurality of optical powers included in the first sample set exhibit a downward change trend in the first fault locating time period, the first fault locating time period is greater than a first time threshold, and a difference between any two of the plurality of optical powers included in the third sample set in the third fault locating time period is less than or equal to a preset threshold; and determining, by the network management device, that a fault has occurred on at least one of a first branch optical path and a second branch optical path, wherein the second optical network device is configured to send the first optical signal to the first optical network device sequentially through the second branch optical path, an optical cable, and the first branch optical path, the second branch optical path is connected between the second optical network device and the optical cable, and the first branch optical path is connected between the first optical network device and the optical cable.

11. The method according to claim 5, wherein the determining, by the network management device based on the first sample set and the third sample set, that the fault type in the optical network is a fault on a transmission optical path comprises:

determining, by the network management device, that the first sample set and the third sample set meet an eighth condition providing that a difference between any two of the plurality of optical powers included in the first sample set is less than or equal to a preset threshold, the plurality of optical powers included in the third sample set exhibit a downward change trend in the third fault locating time period, and the third fault locating time period is greater than a first time threshold; and determining, by the network management device, that a fault has occurred on at least one of a third branch optical path and a fourth branch optical path, wherein the first optical network device is configured to send the third optical signal to the second optical network device sequentially through the third branch optical path, an optical cable, and the fourth branch optical path, the third branch optical path is connected between the first optical network device and the optical cable, and the fourth branch optical path is connected between the second optical network device and the optical cable.

12. A fault locating method for an optical network, the method comprising:

receiving, by a first optical network device, a first optical signal from a second optical network device;

obtaining, by the first optical network device, a first sample set comprising a plurality of optical powers obtained by the first optical network device sequentially sampling the first optical signal for a plurality of times in a first fault locating time period, wherein at least one optical power included in the first sample set is less than or equal to an optical power threshold;

receiving, by the first optical network device, a third sample set from the second optical network device, wherein the third sample set comprises a plurality of optical powers obtained by sequentially sampling a third optical signal from the first optical network device for a plurality of times by the second optical network device in a third fault locating time period;

wherein the first fault locating time period and the third fault locating time period at least partially overlap, or a time interval between the first fault locating time period and the third fault locating time period is less than or equal to a second time threshold; and determining, by the first optical network device, based on a change trend of the plurality of optical powers included in the first sample set and a change trend of the plurality of optical powers included in the third sample set, that the fault type in the optical network is a fault on an optical cable connected between the first optical network device and the second optical network device or a fault on at least one of a first branch optical path and a second branch optical path, wherein the second optical network device is configured to send the first optical signal to the first optical network device sequentially through the second branch optical path, the optical cable, and the first branch optical path, the second branch optical path is connected between the second optical network device and the optical cable, and the first branch optical path is connected between the first optical network device and the optical cable.

13. The method according to claim 12, wherein the determining, by the first optical network device, a fault type in an optical network comprises:

determining, by the first optical network device, that the first sample set meets a first condition providing that the plurality of optical powers decrease sequentially in the first fault locating time period, the first fault locating time period being less than or equal to a first time threshold; and determining, by the first optical network device, that the fault type in the optical network is a fault on a power supply module configured to supply power to the second optical network device.

14. The method according to claim 12, wherein the determining, by the first optical network device, a fault type in an optical network comprises:

determining, by the first optical network device, that the first sample set meets a second condition providing that the plurality of optical powers exhibit a downward change trend in the first fault locating time period, the first fault locating time period being greater than a first time threshold; and determining, by the first optical network device, that the fault type in the optical network is a fault on a transmission optical path configured to transmit the first optical signal.

15. The method according to claim 14, further comprising:

receiving, by the first optical network device, a second sample set including a plurality of optical powers obtained by sequentially sampling a second optical signal for a plurality of times in a second fault locating time period, wherein at least one optical power included in the second sample set is less than or equal to the optical power threshold, the second optical signal being an optical signal transmitted between a third optical network device and a fourth optical network device;

determining, by the first optical network device, that the second sample set meets a third condition providing that the plurality of optical powers included in the second sample set exhibits a downward change trend in the second fault locating time period, the second fault locating time period being greater than the first time threshold; and the determining, by the first optical network device, that the fault type in the optical network is a fault on a transmission optical path comprises:

determining, by the first optical network device, that a fault has occurred on an optical cable configured to transmit the first optical signal and the second optical signal.

16. The method according to claim 12, wherein a time interval between the first fault locating time period and the third fault locating time period is less than or equal to a second time threshold.

17. The method according to claim 12, wherein the first fault locating time period and the third fault locating time period at least partially overlap.

18. The method according to claim 12, wherein the determining, by the first optical network device, based on the first sample set and the third sample set, that the fault type in the optical network is the fault on the optical cable connected between the first optical network device and the second optical network device comprises:

determining, by the first optical network device, that the first sample set and the third sample set meet a fourth condition providing that the plurality of optical powers included in the first sample set exhibit a downward change trend in the first fault locating time period, the plurality of optical powers comprised in the third sample set exhibit a downward change trend in the third fault locating time period, and both the first fault locating time period and the third fault locating time period are greater than a first time threshold; and determining, by the first optical network device, that a fault has occurred on an optical cable connected between the first optical network device and the second optical network device.

19. The method according to claim 12, wherein the determining, by the first optical network device based on the first sample set and the third sample set, that the fault type in the optical network is a fault on at least one of the first branch optical path and the second branch optical path comprises:

determining, by the first optical network device, that the first sample set and the third sample set meet a seventh condition providing that the plurality of optical powers included in the first sample set exhibit a downward change trend in the first fault locating time period, the first fault locating time period is greater than a first time threshold, and a difference between any two of the plurality of optical powers included in the third sample set in the third fault locating time period is less than or equal to a preset threshold; and determining, by the first optical network device, that a fault has occurred on at least one of a first branch optical path and a second branch optical path, wherein the second optical network device is configured to send the first optical signal to the first optical network device sequentially through the second branch optical path, an optical cable, and the first branch optical path, the second branch optical path is connected between the second optical network device and the optical cable, and the first branch optical path is connected between the first optical network device and the optical cable.

20. A network management device, comprising:

a memory including program code; and at least one processor, connected to the memory and operable, upon execution of the program code, to cause the network management device to:

obtain a first sample set from a first optical network device, wherein the first sample set comprises a plurality of optical powers obtained by the first optical network device sequentially sampling a first optical signal for a plurality of times in a first fault locating time period, at least one optical power included in the first sample set being less than or equal to an optical power threshold;

obtain a third sample set from a second optical network device, wherein the third sample set comprises a plurality of optical powers obtained by sequentially sampling a third optical signal from the first optical network device for a plurality of times by the second optical network device in a third fault locating time period, wherein the first fault locating time period and the third fault locating time period at least partially overlap, or a time interval between the first fault locating time period and the third fault locating time period is less than or equal to a second time threshold; and determine, based on the first sample set and the third sample set, a fault type in an optical network based on a change trend of the plurality of optical powers, wherein the fault type in the optical network is a fault on an optical cable connected between the first optical network device and the second optical network device or a fault on at least one of a first branch optical path and a second branch optical path.

* * * * *